(12) United States Patent
Kubota et al.

(10) Patent No.: US 11,433,813 B2
(45) Date of Patent: Sep. 6, 2022

(54) VEHICULAR ELECTRONIC MIRROR SYSTEM

(71) Applicant: TOYOTA JIDOSHA KABUSHIKI KAISHA, Toyota (JP)

(72) Inventors: Yosuke Kubota, Toyota (JP); Goro Asai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 16/682,534

(22) Filed: Nov. 13, 2019

(65) Prior Publication Data

US 2020/0156543 A1 May 21, 2020

(30) Foreign Application Priority Data

Nov. 15, 2018 (JP) .............................. JP2018-214774

(51) Int. Cl.
*B60R 1/00* (2022.01)
*H04N 5/247* (2006.01)
(Continued)

(52) U.S. Cl.
CPC ............. *B60R 1/006* (2013.01); *H04N 5/247* (2013.01); *B60K 35/00* (2013.01); *B60R 2001/1253* (2013.01); *B60R 2300/105* (2013.01); *B60R 2300/108* (2013.01); *B60R 2300/303* (2013.01); *B60R 2300/8046* (2013.01)

(58) Field of Classification Search
CPC ........ B60K 2370/152; B60K 2370/176; B60K 2370/193; B60K 2370/21; B60K 35/00; B60R 1/00; B60R 1/006; B60R 2001/1253; B60R 2300/105; B60R 2300/108; B60R 2300/303; B60R 2300/70; B60R 2300/8046; H04N 5/23238; H04N 5/23293; H04N 5/247
See application file for complete search history.

(56) References Cited

U.S. PATENT DOCUMENTS

2008/0231703 A1 9/2008 Nagata et al.
2009/0079553 A1 3/2009 Yanagi et al.
(Continued)

FOREIGN PATENT DOCUMENTS

JP 2008-230558 A 10/2008
JP 2009-081666 A 4/2009
(Continued)

*Primary Examiner* — Farzana Hossain
(74) *Attorney, Agent, or Firm* — Hunton Andrews Kurth LLP

(57) ABSTRACT

A vehicular electronic mirror system includes a rear imaging device configured to capture an image of a rear side of a vehicle, rear lateral imaging devices respectively configured to capture images of right and left rear sides of the vehicle, and an electronic control device configured to perform, according to at least one of a state of the vehicle and a situation around the vehicle, different image processing processes on a rear image captured by the rear imaging device and rear lateral images captured by the rear lateral imaging devices and selected according to at least one of the state of the vehicle and the situation around the vehicle, and to cause a display device to display the rear image and the rear lateral images.

8 Claims, 21 Drawing Sheets

(51) Int. Cl.
*B60R 1/12* (2006.01)
*B60K 35/00* (2006.01)

(56) References Cited

U.S. PATENT DOCUMENTS

| | | | |
|---|---|---|---|
| 2010/0049405 A1* | 2/2010 | Li | G08G 1/167 |
| | | | 701/45 |
| 2016/0185292 A1* | 6/2016 | Asai | B60R 1/00 |
| | | | 348/148 |
| 2018/0154831 A1* | 6/2018 | Spencer | H04N 5/23238 |
| 2018/0272948 A1 | 9/2018 | Kumon et al. | |
| 2019/0102634 A1* | 4/2019 | Sagami | G06V 20/593 |
| 2019/0191081 A1 | 6/2019 | Shidochi et al. | |
| 2019/0199940 A1* | 6/2019 | Shidochi | B60R 1/00 |
| 2019/0248288 A1* | 8/2019 | Oba | B60R 1/00 |
| 2020/0041992 A1* | 2/2020 | Nagashima | G06F 3/0488 |

FOREIGN PATENT DOCUMENTS

| | | | |
|---|---|---|---|
| JP | 2014204132 A | 10/2014 |
| JP | 2018164186 A | 10/2018 |
| JP | 2019-110492 A | 7/2019 |

\* cited by examiner

VEHICULAR ELECTRONIC MIRROR SYSTEM

INCORPORATION BY REFERENCE

The disclosure of Japanese Patent Application No. 2018-214774 filed on Nov. 15, 2018 including the specification, drawings and abstract is incorporated herein by reference in its entirety.

BACKGROUND

1. Technical Field

The disclosure relates to a vehicular electronic mirror system.

2. Description of Related Art

A technique related to a vehicle surroundings monitoring device is disclosed in Japanese Unexamined Patent Application Publication No. 2008-230558 (JP 2008-230558 A). In this vehicle surroundings monitoring device, a rear image on the rear side of a vehicle taken by an on-vehicle camera provided at the center in the vehicle width direction and rear lateral images on the right and left rear side of a vehicle respectively taken by on-vehicle cameras respectively provided at positions corresponding to right and left side mirrors are synthesized and displayed on a display device.

SUMMARY

By the way, when displaying the rear image and the rear lateral images as in the configuration disclosed in JP 2008-230558 A, it is desirable that the images be integrated and seamlessly displayed on the display device. However, the rear image and the rear lateral images are captured by different on-vehicle cameras. Thus, a region where the ranges captured by the respective on-vehicle cameras are partially overlapped with one another is generated in order to integrate and seamlessly display the images on the display device. Thus, at the time of integrating the images, a process is performed to delete the image of the overlapping region in one on-vehicle camera. Therefore, if an object is present in the deleted region, the object may not be displayed on the display device, and the vehicle occupant may not be able to properly grasp the situation around the vehicle. For this reason, the above-mentioned related art has room for improvement in this respect.

The disclosure provides a vehicular electronic mirror system for enabling a vehicle occupant to properly grasp a situation around a vehicle.

An aspect of the disclosure provides a vehicular electronic mirror system. The vehicular electronic mirror system includes: a rear imaging device configured to capture an image of a rear side of a vehicle; rear lateral imaging devices respectively configured to capture images of right and left rear sides of the vehicle; and an electronic control device configured to perform, according to at least one of a state of the vehicle and a situation around the vehicle, different image processing processes on a rear image captured by the rear imaging device and rear lateral images captured by the rear lateral imaging devices, the rear lateral images being selected according to at least one of the state of the vehicle and the situation around the vehicle, and cause a display device to display the rear image and the rear lateral images.

According to the above-described configuration, a vehicular electronic mirror system includes a rear imaging device, a rear lateral imaging devices and image processing control device. The rear imaging device captures an image of the rear side of a vehicle, and the rear lateral imaging devices capture images of the right and left rear sides of the vehicle. In the image processing control device, the rear image captured by the rear imaging device and the rear lateral images captured by the rear lateral imaging devices selected according to at least one of the state of the vehicle and the situation around the vehicle are subjected to different image processing processes depending on at least one of the state of the vehicle and the situation around the vehicle and are displayed on a display device. That is, the image processing control device causes the display device to display at least the rear image and also causes the display device to display the rear image and the rear lateral images depending on at least one of the state of the vehicle and the situation around the vehicle. In the state in which the rear image and the rear lateral images are combined and displayed on the display device, the vehicle occupant can visually recognize a wide range on the rear side of the vehicle. On the other hand, in the state in which the rear image and the rear lateral images are combined and displayed on the display device, the image of one of the regions where the ranges respectively image-captured by the rear imaging device and the rear lateral imaging devices are overlapped with each other is deleted. Therefore, something present in the deleted image is lost. Thus, when the need to visually recognize a wide range on the rear side of the vehicle is low, the display device is caused to display only the uninterrupted rear image captured only by the rear imaging device, which makes it possible to grasp the situation around the vehicle without any lost range.

In the aspect of the disclosure, the electronic control device may be configured to include a vehicle speed of the vehicle into a condition for selecting the rear lateral images and a condition for performing the image processing processes.

With the above configuration, it may be possible to display an appropriate image on the display device in conformity with the state of the vehicle and the situation around the vehicle, which are changed depending on the vehicle speed.

In the aspect of the disclosure, the electronic control device may be configured to select, when the vehicle speed is equal to or higher than a predetermined threshold value, the rear lateral images, and cause the display device to display a first display image generated by combining the rear image and the rear lateral images, and cause the display device to display, when the vehicle speed is lower than the predetermined threshold value, a second display image generated only from the rear image.

With the above configuration, when the vehicle is traveling at a relatively high speed, it may be possible for the vehicle occupant to grasp the situation over a wide range on the rear side of the vehicle using the display device.

With the above configuration, when the vehicle is traveling at a relatively low speed or when the vehicle is stopped, it may be possible for the vehicle occupant to grasp the situation on the rear side of the vehicle without any lost range.

In the aspect of the disclosure, the electronic control device may be configured to include a shift position of the vehicle into a condition for selecting the rear lateral images and a condition for performing the image processing processes.

With the above configuration, an appropriate image may be displayed on the display device in conformity with the state of the vehicle and the situation around the vehicle, which are changed depending on the shift position.

In the aspect of the disclosure, the electronic control device may be configured to cause the display device, when the shift position of the vehicle is selected to a position corresponding to a state in which the vehicle is parked or a position corresponding to a state in which the vehicle is moved backward, to display a second display image generated only from the rear image.

With the above configuration, when the vehicle occupant wants to reliably grasp the rear side of the vehicle, only the rear image may be displayed on the display device, which enables the vehicle occupant to grasp the situation on the rear side of the vehicle without any lost range.

In the aspect of the disclosure, the electronic control device may be configured to include movement of the vehicle in a right and left direction into a condition for selecting the rear lateral images and a condition for performing the image processing processes.

With the above configuration, an appropriate image may be displayed on the display device in conformity with the state of the vehicle and the situation around the vehicle, which are changed by the movement of the vehicle in the right and left direction.

In the aspect of the disclosure, the electronic control device may be configured to select the rear lateral images, and cause the display device to display a third display image, in which a rear lateral image on either a left side or a right side to which the vehicle moves is overlapped on a first display image generated by combining the rear image and the rear lateral images or a second display image generated only from the rear image, when the vehicle is moved in the right and left direction.

With the above configuration, the vehicle occupant may visually recognize the uncombined rear lateral image on the moving direction side while grasping the situation in the wide range on the rear side of the vehicle. Therefore, the situation of the blind spot on one of the right and left sides to which the vehicle moves, among the blind spots on the image generated by the rear vehicle, may be grasped using the third display image.

In the aspect of the disclosure, the electronic control device may be configured to include a case where an object existing around the vehicle is detected, into a condition for selecting the rear lateral images according to the state of the vehicle and a condition for the situation around the vehicle and performing the image processing processes according to the state of the vehicle.

With the above configuration, the case where an object is detected around the vehicle may be used as a condition for selecting the rear lateral image and for performing the image processing process. Therefore, the image processing control device may cause the display device to display an appropriate image that makes it easy for the vehicle occupant to grasp the object present around the vehicle.

In the aspect of the disclosure, the electronic control device may be configured to select, the rear lateral images, and cause the display device to display a fourth display image, in which a rear lateral image on either a left side or a right side corresponding to a direction in which an object is detected is overlapped on a first display image generated by combining the rear image and the rear lateral images or a second display image generated only from the rear image, when the object is detected around the vehicle.

With the above configuration, the vehicle occupant may also visually recognize the uncombined rear lateral image on the object-detected side while grasping the situation of the wide range on the rear side of the vehicle. Therefore, it may become easy to grasp the object.

In the aspect of the disclosure, the electronic control device may be configured to continuously switch one image to another image when switching an image to be displayed on the display device.

With the above configuration, the vehicle occupant may follow the change of the image with eyes. Therefore, as compared with the case where the image is switched suddenly, it may be possible to suppress confusion caused by the image switching.

As used herein, the term "continuously" includes continuously performing to the middle of a process, continuously performing from the middle of a process, and processing stepwise.

The vehicular electronic mirror system according to one embodiment has an excellent effect that the vehicle occupant may appropriately grasp the situation around the vehicle.

Moreover, the vehicular electronic mirror system according to one embodiment has an excellent effect that the vehicle occupant may more appropriately grasp the situation around the vehicle.

In addition, the vehicular electronic mirror system according to one embodiment has an excellent effect that the discomfort of the vehicle occupant may be reduced.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment

Figure 1:
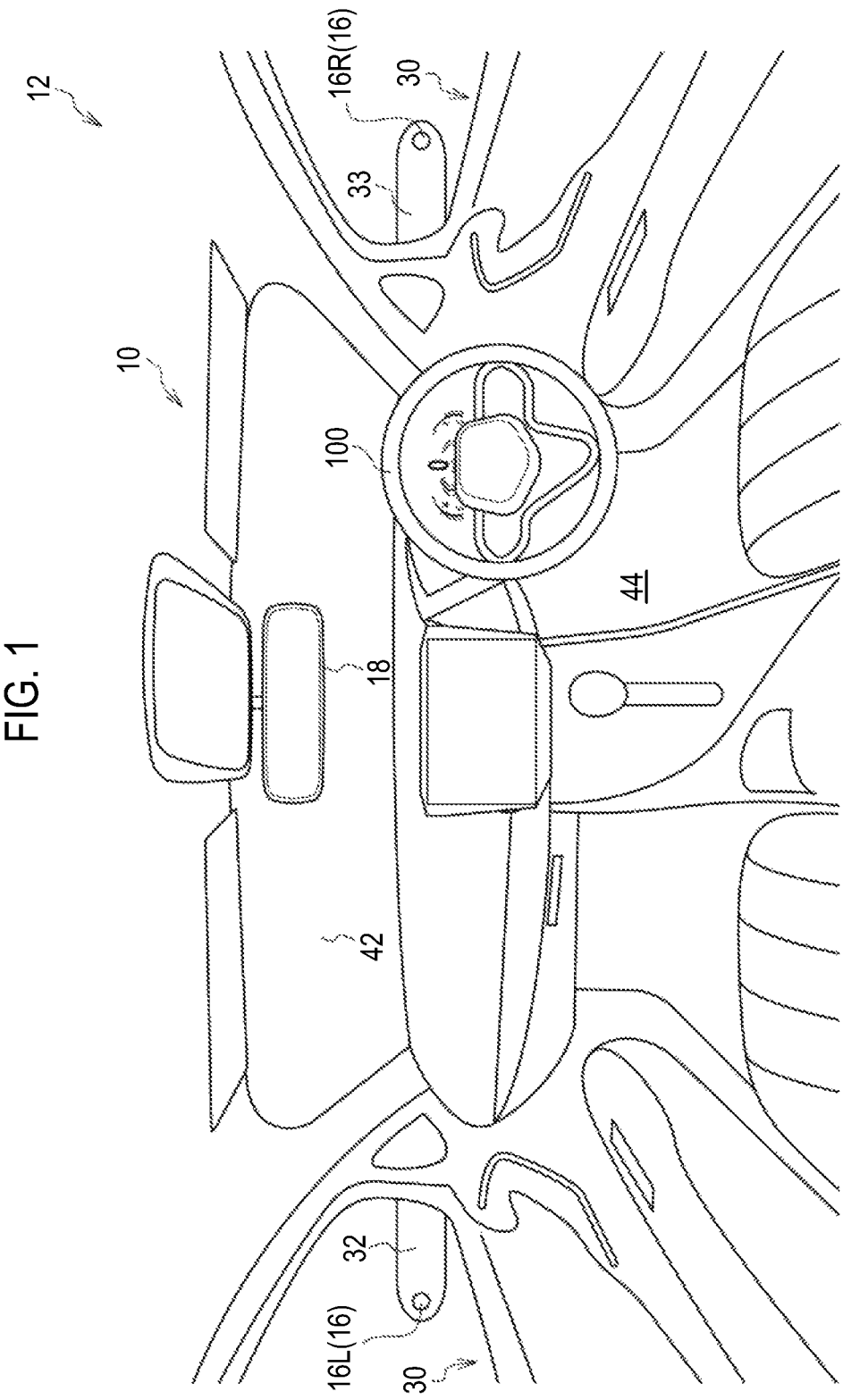
FIG. 1 is a schematic perspective view showing a vehicle interior of a vehicle including a vehicular electronic mirror system according to a first embodiment as viewed toward the front side of the vehicle.

A vehicular electronic mirror system according to a first embodiment of the disclosure will now be described with reference to FIGS. 1 to 9. In the drawings, the same or equivalent components and parts are denoted by the same reference numerals. Furthermore, the dimensional proportions in the drawings are exaggerated for the convenience of description and may differ from the actual proportions.

Hardware Configuration

Figure 3:
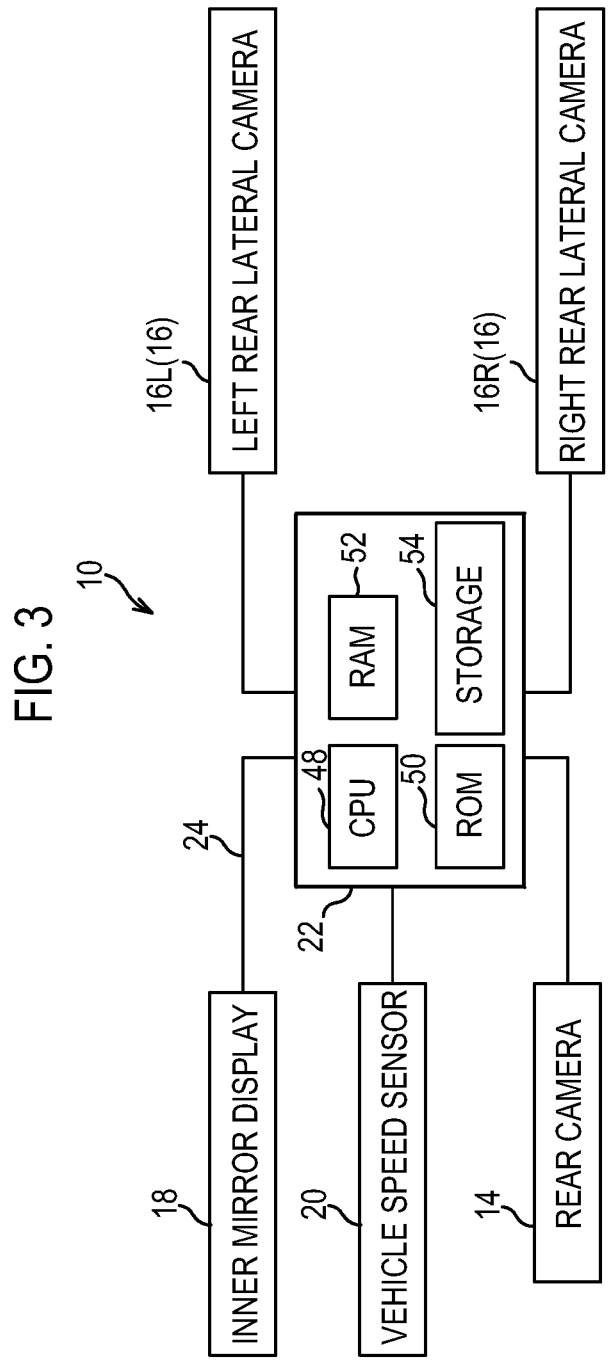
FIG. 3 is a block diagram showing a hardware configuration of the vehicular electronic mirror system according to the first embodiment.

FIG. 3 is a block diagram showing a hardware configuration of a vehicular electronic mirror system 10. As shown in FIG. 3, the vehicular electronic mirror system 10 includes a rear camera 14 as a rear imaging device mounted on a vehicle 12 (see FIG. 1), rear lateral camera units 16 as rear lateral imaging devices, an inner mirror display 18 as a display device, a vehicle speed sensor 20, and a control device 22 as an image processing control device. The respective components are communicably connected to one another via a bus 24.

Figure 2:
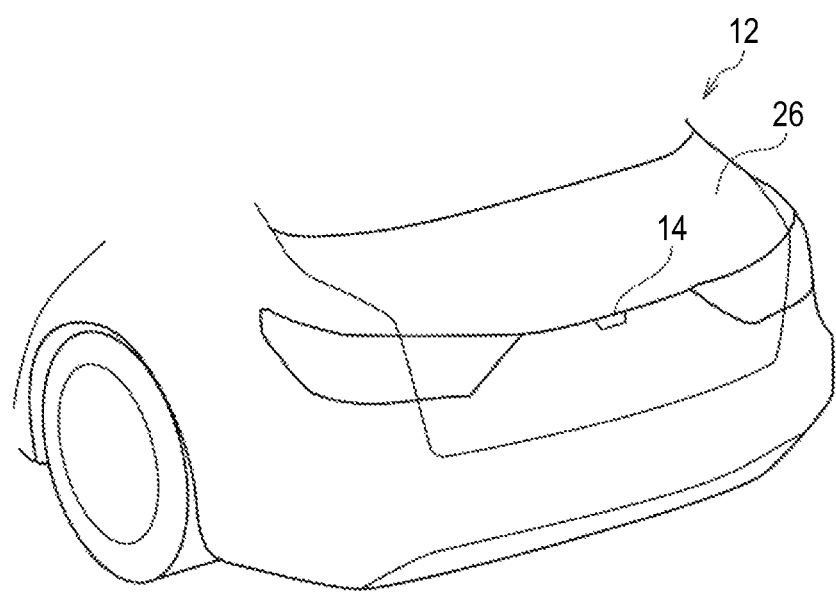
FIG. 2 is a schematic perspective view showing a rear portion of the vehicle including the vehicular electronic mirror system according to the first embodiment.

As shown in FIG. 2, the rear camera 14 is disposed at a rear portion of a trunk lid 26 of the vehicle 12. An imaging optical axis (lens) is directed to the rear side of the vehicle so as to capture an image of the rear side of the vehicle 12. The rear camera 14 may be disposed at any position at which an image of the rear side of the vehicle 12 can be captured. The rear camera 14 may be arranged near a rear bumper of the vehicle 12 or may be arranged to capture an image of the rear side of the vehicle 12 through a rear windshield glass. The rear camera 14 has a lens with a fixed focal point and is not provided with a mechanism for changing the orientation of the imaging optical axis. The rear camera 14 captures an image of a certain imaging range 28 shown in FIG. 5.

As shown in FIG. 1, the base of a camera support 32 having a substantially rectangular parallelepiped shape and an arc-shaped tip portion is attached to the front end of the vertical middle portion of a vehicle door 30 (left front side door) of the vehicle 12, so that the tip portion of the camera support 32 protrudes to the outside of the vehicle. A left rear lateral camera 16L constituting a part of the rear lateral camera units 16 is attached near the tip portion of the camera support 32. The left rear lateral camera 16L has an imaging optical axis (lens) directed to the left rear side of the vehicle and captures an image of a part of the left rear side and the left lateral side of the vehicle. The camera support 32 is pivotable in the front-rear direction of the vehicle using the vertical direction of the vehicle as an axial direction. By the driving force of an actuator not shown, the camera support 32 is pivotable to a storage position at which the longitudinal direction of the camera support 32 approximately follows the outer surface of the vehicle, or a return position at which the left rear lateral camera 16L captures an image of the left rear side of the vehicle.

As an example, the left rear lateral camera 16L has no mechanism for changing the orientation of the imaging optical axis and includes a lens having a fixed focal point and a relatively wide angle of view. For this reason, when the camera support 32 is located at the return position, the left rear lateral camera 16L captures an image of a relatively wide and constant imaging range (a constant imaging range 38 shown in FIG. 5) on the left rear side of the vehicle.

Furthermore, the base of a camera support 33 having a symmetrical shape with respect to the camera support 33 is attached to the front end of the vertical middle portion of a vehicle door 30 (right front side door) of the vehicle 12. A right rear lateral camera 16R constituting another part of the rear lateral camera units 16 is attached near the tip portion of the camera support 33. The right rear lateral camera 16R has an imaging optical axis (lens) directed to the right rear side of the vehicle and captures an image of a part of the right rear side and the right lateral side of the vehicle. The camera support 33 is also pivotable in the front-rear direction of the vehicle using the vertical direction of the vehicle as an axial direction. By the driving force of an actuator not shown, the camera support 33 is pivotable to a storage position at which the longitudinal direction of the camera support 33 approximately follows the outer surface of the vehicle, or a return position at which the right rear lateral camera 16R captures an image of the right rear side of the vehicle.

Just like the left rear lateral camera 16L, as an example, the right rear lateral camera 16R has no mechanism for changing the orientation of the imaging optical axis and includes a lens having a fixed focal point and a relatively wide angle of view. For this reason, when the camera support 33 is located at the return position, the right rear lateral camera 16R captures an image of a relatively wide and constant imaging range (a constant imaging range 40 shown in FIG. 5) on the right rear side of the vehicle.

The inner mirror display 18 is provided on the upper side of a front windshield glass 42 and substantially at the center in the width direction of the vehicle. As an example, the inner mirror display 18 is formed of, for example, a liquid crystal panel and is capable of displaying an image toward the inside of a passenger compartment 44. The inner mirror display 18 displays an image obtained by combining and processing the images captured by the rear camera 14, the left rear lateral camera 16L and the right rear lateral camera 16R using the control device 22. That is, the inner mirror display 18 functions as a substitute for an inner mirror. A vehicle occupant can confirm the situation around the vehicle 12 on the rear side of the vehicle by visually recognizing the image displayed on the inner mirror display 18.

As shown in FIG. 3, the control device 22 includes a CPU (Central Processing Unit) 48, a ROM (Read Only Memory) 50, a RAM (Random Access Memory) 52 and a storage 54, which are provided therein.

The CPU 48, which is a central processing unit, executes various programs and controls the respective parts. That is, the CPU 48 reads a program from the ROM 50 or the storage 54 and executes the program using the RAM 52 as a work area. The CPU 48 controls the above-described components and performs various arithmetic processing processes based on the program stored in the ROM 50 or the storage 54. In the present embodiment, the ROM 50 or the storage 54 stores a surroundings display program.

The ROM 50 stores various programs and various data. The RAM 52 serves as a work area and temporarily stores a program or data. The storage 54 is configured by an HDD (Hard Disk Drive) or an SSD (Solid State Drive). The storage 54 stores various programs including an operating system, and various data.

The vehicle speed sensor 20 is provided near the drive mechanism of the vehicle 12 as an example. The vehicle speed sensor 20 detects and outputs the rotational speed of the drive mechanism.

Functional Component

When executing the surroundings display program, the vehicular electronic mirror system 10 implements various functions using the above-described hardware resources. The functional components realized by the vehicular electronic mirror system 10 will be described.

Figure 4:
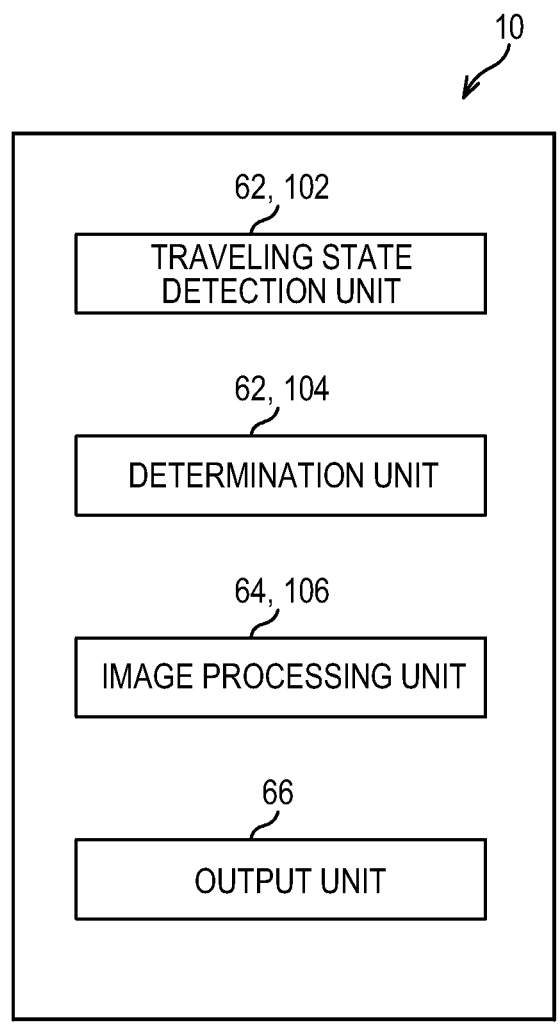
FIG. 4 is a block diagram showing the functional components of the vehicular electronic mirror system according to the first embodiment.

FIG. 4 is a block diagram showing an example of the functional components of the vehicular electronic mirror system 10.

As shown in FIG. 4, the vehicular electronic mirror system 10 includes a traveling state detection unit 60, a determination unit 62, an image processing unit 64 and an output unit 66 as functional components. Each functional component is realized by the CPU 48 of the control device 22 that reads and executes the surroundings display program stored in the ROM 50 or the storage 54 (see FIG. 3).

The traveling state detection unit 60 receives the rotational speed of the drive mechanism from the vehicle speed sensor 20 and detects the vehicle speed of the vehicle 12 from the rotational speed.

The determination unit 62 receives the vehicle speed from the traveling state detection unit 60 and determines the traveling state of the vehicle 12 from the magnitude of the vehicle speed with respect to a first threshold value and a second threshold value which are predetermined threshold values set in advance. That is, if the vehicle speed of the vehicle 12 is equal to or lower than the first threshold value, it is determined that the vehicle 12 is traveling at a low speed. On the other hand, if the vehicle speed of the vehicle 12 is equal to or higher than the second threshold value, it is determined that the vehicle 12 is traveling at a high speed. As an example, the first threshold value is set smaller than the second threshold value. Furthermore, as an example, the first threshold value is 15 km/h and the second threshold value is 20 km/h.

Furthermore, depending on the traveling state of the vehicle 12, the determination unit 62 selects the rear lateral images captured by the left rear lateral camera 16L and the right rear lateral camera 16R and transmits the selected images to the image processing unit 64. Specifically, if it is determined that the vehicle 12 is traveling at a high speed, the rear lateral images captured by the left rear lateral camera 16L and the right rear lateral camera 16R are selected and transmitted to the image processing unit 64. On the other hand, if it is determined that the vehicle 12 is traveling at a low speed, the rear lateral images captured by the left rear lateral camera 16L and the right rear lateral camera 16R are not selected. As a result, the rear lateral images are not transmitted to the image processing unit 64.

The image processing unit 64 performs an image processing process on the rear image captured by the rear camera 14 to adapt the rear image to the inner mirror display 18. When the rear lateral images are received from the determination unit 62, the rear image and the rear lateral images are combined so as to be continuous on a virtual projection plane 72 shown in FIG. 5. The image generated by combining the rear image and the rear lateral images corresponds to a first display image 68 (see FIG. 7) in the embodiments. On the other hand, the image generated only from the rear image corresponds to a second display image 70 (see FIG. 8) in the embodiments.

Figure 5:
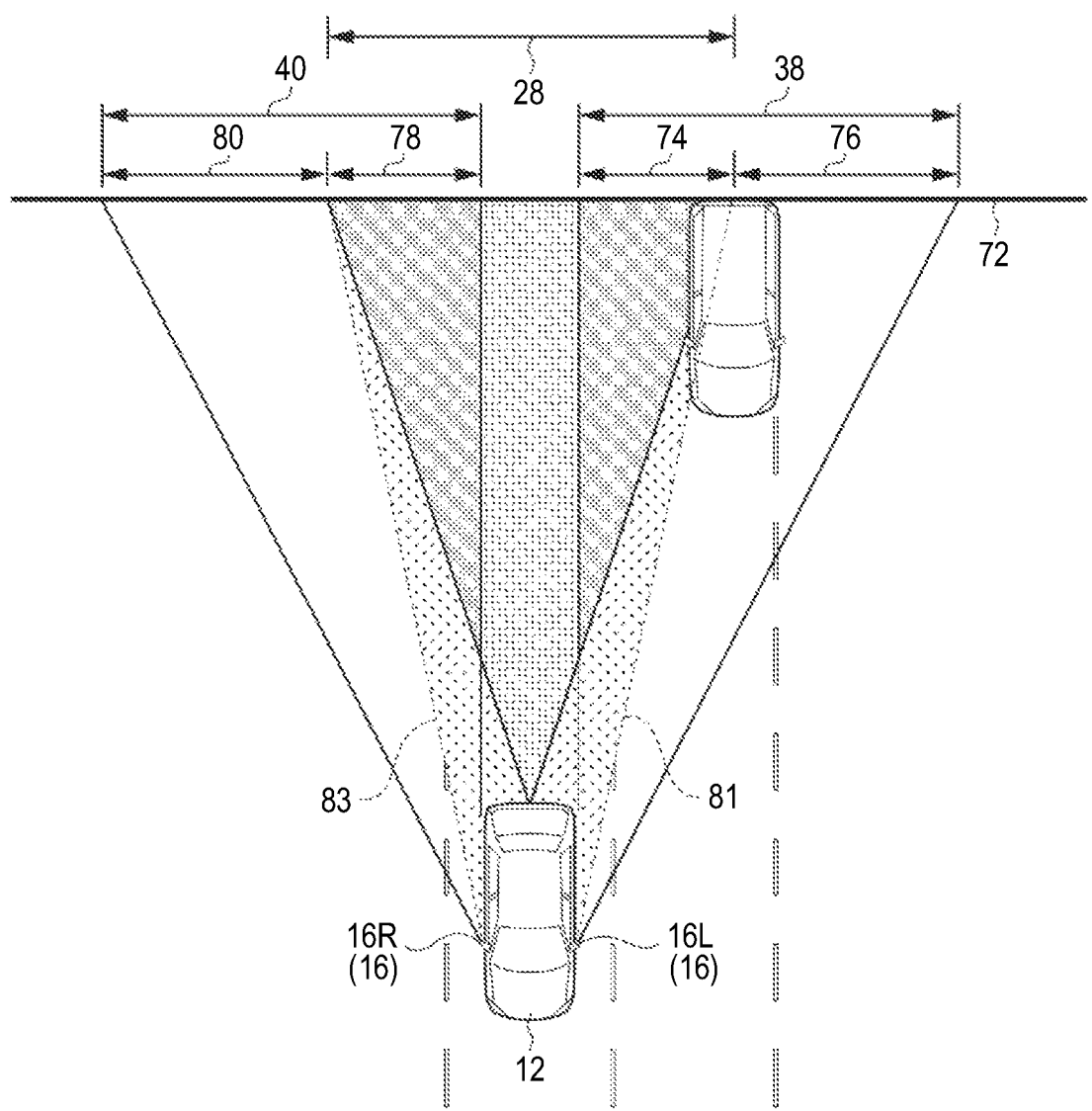
FIG. 5 is a schematic plan view showing an imaging range at the time of high speed traveling in the vehicle including the vehicular electronic mirror system according to the first embodiment.

The details of the first display image 68 shown in FIG. 7 will now be described. When displaying the first display image 68, the image processing unit 64 extracts an image, which is obtained by deleting a region overlapping with the rear image captured by the rear camera 14 on the virtual projection plane 72, from the left rear lateral image captured by the left rear lateral camera 16L. That is, as shown in FIG. 5, the imaging range 38 of the left rear lateral image by the left rear lateral camera 16L, which overlaps with the imaging range 28 of the rear image by the rear camera 14 on the virtual projection plane 72, is a deletion region 74. The image processing unit 64 extracts an image corresponding to an extraction region 76 by deleting the deletion region 74 from the left rear lateral image.

Furthermore, the image processing unit 64 extracts an image, which is obtained by deleting a region overlapping with the rear image captured by the rear camera 14 on the virtual projection plane 72, from the right rear lateral image captured by the right rear lateral camera 16R. That is, the imaging range 40 of the right rear lateral image by the right rear lateral camera 16R, which overlaps with the imaging range 28 of the rear image by the rear camera 14 on the virtual projection plane 72, is a deletion region 78. The image processing unit 64 extracts an image corresponding to an extraction region 80 by deleting the deletion region 78 from the right rear lateral image.

Figure 7:
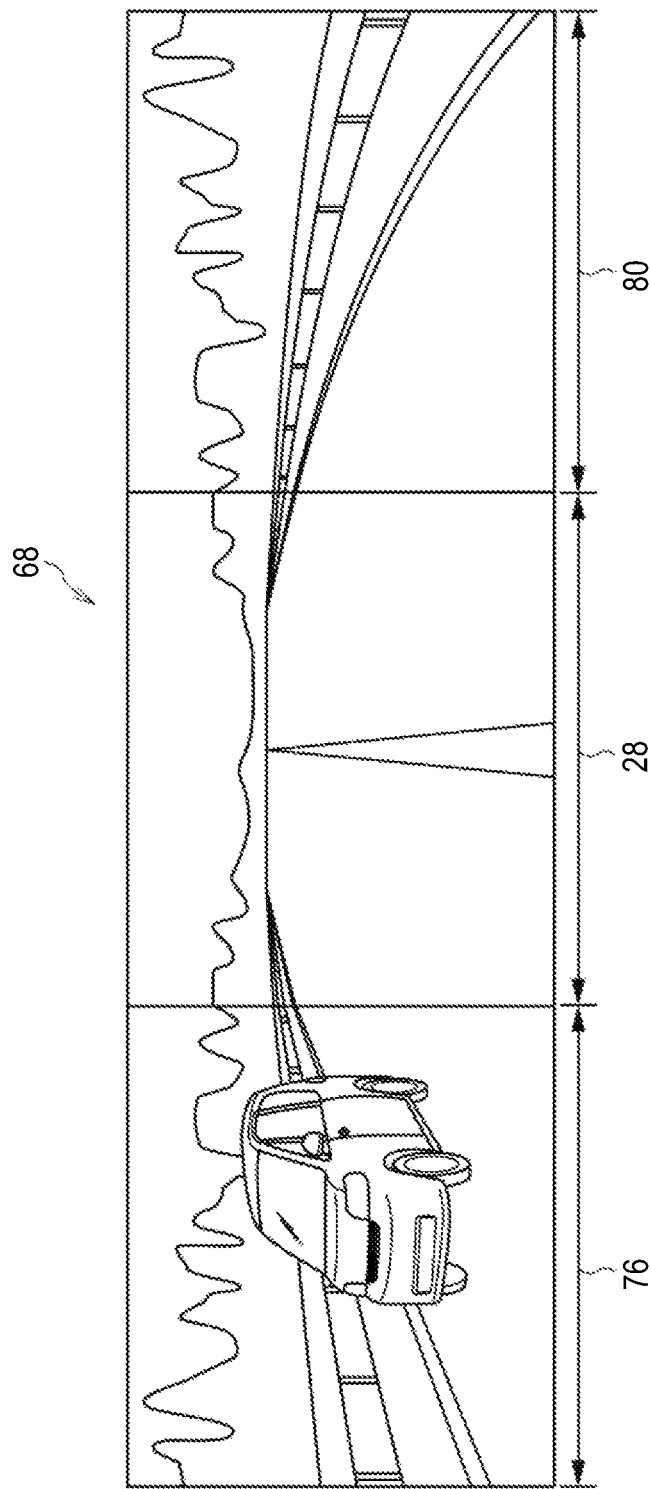
FIG. 7 is a schematic view showing a display state on a display device at the time of high speed traveling corresponding to FIG. 5 in the vehicle including the vehicular electronic mirror system according to the first embodiment.

Thereafter, the image processing unit 64 combines the image extracted from the left rear lateral image with the rear image to lie on the left side of the rear image and combines the image extracted from the right rear lateral image with the rear image to lie on the right side of the rear image, thereby generating a first display image 68 as shown in FIG. 7. Thus, the first display image 68 is an image in which the region of the rear image, the region of the left rear lateral image and the region of the right rear lateral image are smoothly continuous. The first display image 68 is an image close to a case where the occupant of the vehicle 12 looks at the rear side and the rear lateral sides of the vehicle 12 with the eyes.

Figure 6:
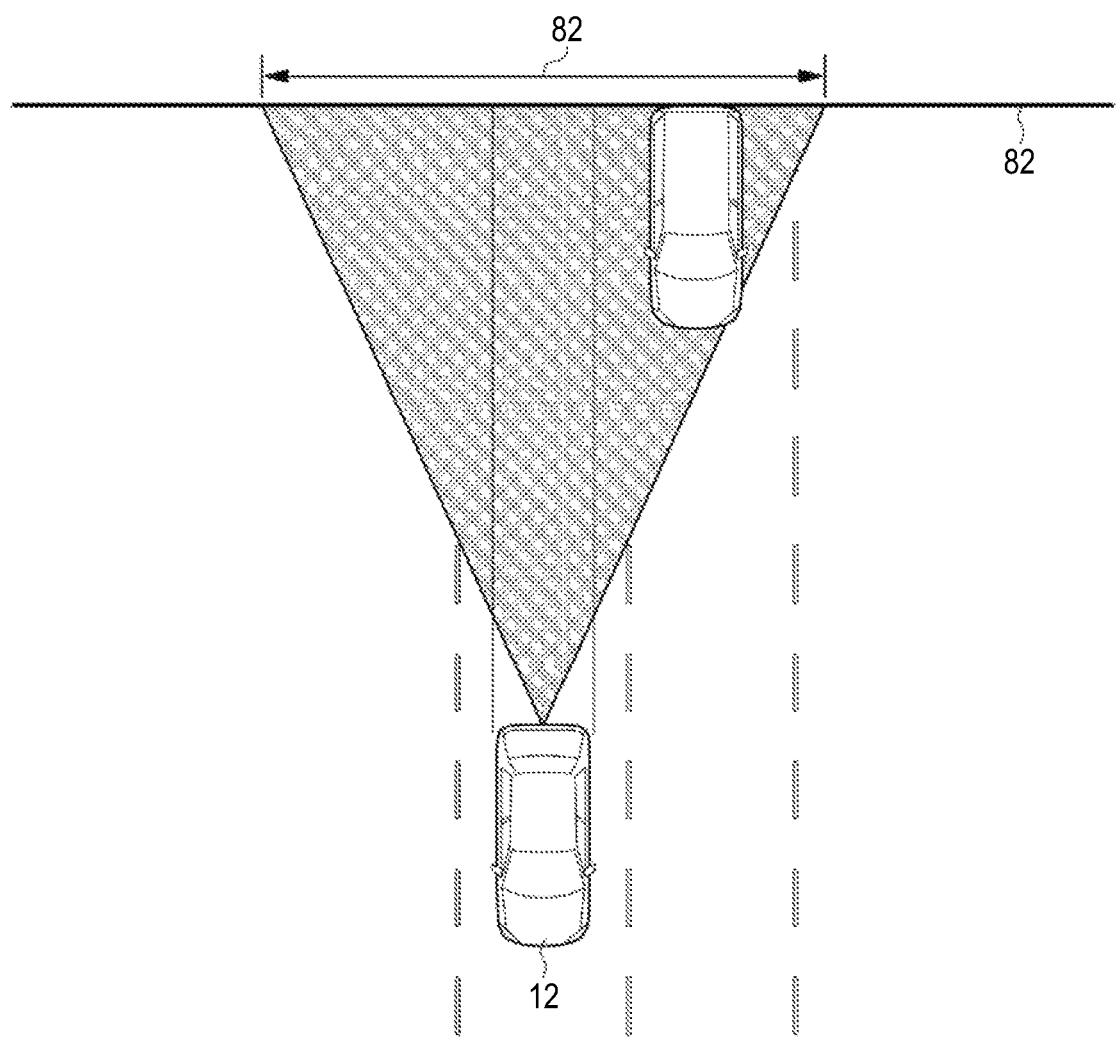
FIG. 6 is a schematic plan view showing an imaging range at the time of low speed traveling in the vehicle including the vehicular electronic mirror system according to the first embodiment.

Next, the details of the second display image 70 shown in FIG. 8 will be described. When displaying the second display image 70, the image processing unit 64 displays only the rear image captured by the rear camera 14. That is, as shown in FIG. 6, the image processing unit 64 generates a second display image 70 shown in FIG. 8 from an imaging region 82 on the rear side of the vehicle by the rear camera 14, which is set wider than in the case of combining the first display image 68. In other words, the second display image 70 is a so-called blind-spot-free image that does not have blind regions 81 and 83 (see FIG. 5) not appearing in the image due to the generation of the deletion regions 74 and 78 in the first display image 68.

The output unit 66 outputs the image from the image processing unit 64 to the inner mirror display 18. Thus, the first display image 68 or the second display image 70 is displayed on the inner mirror display 18. When switching one of the first display image 68 or the second display image 70 displayed on the inner mirror display 18 to the other, the output unit 66 continuously switches the image from the beginning to the end of the process.

Process Flow

Figure 9:
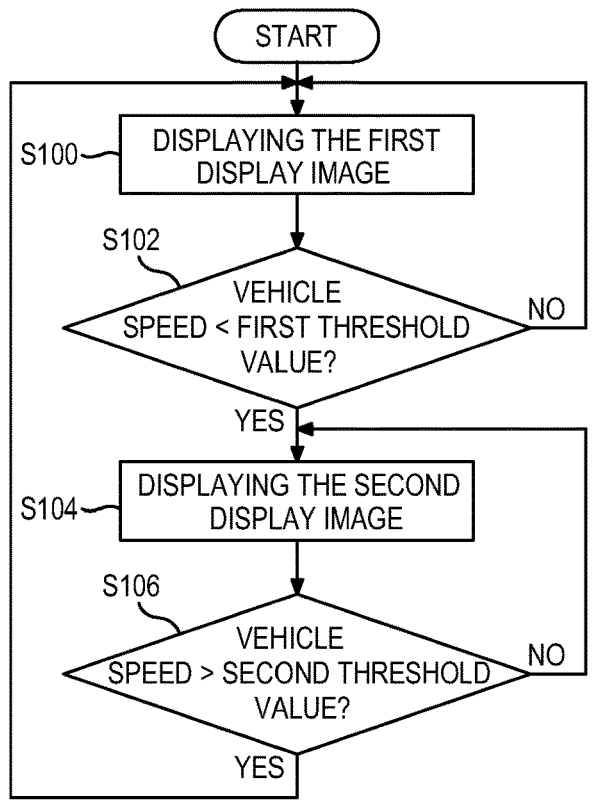
FIG. 9 is a flowchart showing a flow of an operation of the vehicular electronic mirror system according to the first embodiment.

Next, the operation of the vehicular electronic mirror system 10 will be described. FIG. 9 is a flowchart showing the flow of the operation of the vehicular electronic mirror system 10. The CPU 48 reads out the surroundings display program from the ROM 50 or the storage 54, develops the surroundings display program on the RAM 52, and executes the surroundings display program, whereby the image display is performed.

The CPU 48 displays the first display image 68 on the inner mirror display 18 (step S100). Then, the CPU 48 determines whether the vehicle speed of the vehicle 12 is lower than the first threshold value (step S102). If the vehicle speed is higher than the first threshold value (if NO in step S102), i.e., if the vehicle 12 is traveling at a high speed, the process starting from step S100 is repeated.

If the vehicle speed is lower than the first threshold value (if YES in step S102), i.e., if the vehicle 12 is traveling at a low speed or is stopped, the CPU 48 causes the inner mirror display 18 to display the second display image 70 (step S104).

Thereafter, the CPU 48 determines whether the vehicle speed is higher than the second threshold value (step S106). If the vehicle speed is lower than the second threshold value (if NO in step S106), i.e., if the vehicle 12 is traveling at a low speed or is stopped, the CPU 48 repeats the process starting from step S104. On the other hand, if the vehicle speed is higher than the second threshold value (if YES in step S106), i.e., if the vehicle 12 is traveling at a high speed, the CPU 48 repeats the process starting from step S100. Then, when a system termination process of a power unit system of the vehicle 12 is performed, the CPU 48 terminates the process based on the surroundings display program.

Operation and Effect of the First Embodiment

Next, the operation and effect of the first embodiment will be described.

In the present embodiment, as shown in FIG. 3, the vehicular electronic mirror system 10 includes the rear camera 14, the rear lateral camera units 16 and the control device 22. As shown in FIG. 5, the rear camera 14 captures an image of the rear side of the vehicle 12, and the rear lateral camera units 16 capture images of the right and left rear sides of the vehicle 12. In the control device 22, the rear image captured by the rear camera 14 and the rear lateral image selected according to at least one of the state of the vehicle 12 and the situation around the vehicle 12 are subjected to different image processing processes depending on at least one of the state of the vehicle 12 and the situation around the vehicle 12 and are displayed on the inner mirror display 18. That is, the control device 22 causes the inner mirror display 18 to display at least the rear image and also causes the inner mirror display 18 to display the rear image and the rear lateral images depending on at least one of the state of the vehicle 12 and the situation around the vehicle 12. In the state in which the rear image and the rear lateral images are combined and displayed on the inner mirror display 18, the vehicle occupant can visually recognize a wide range on the rear side of the vehicle. On the other hand, in the state in which the rear image and the rear lateral images are combined and displayed on the inner mirror display 18, the image of one of the regions where the ranges respectively image-captured by the rear camera 14 and the rear lateral camera units 16 are overlapped with each other is deleted. Therefore, something present in the deleted image is lost. Thus, when the need to visually recognize a wide region on the rear side of the vehicle is low, the inner mirror display 18 is caused to display only the uninterrupted rear image captured only by the rear camera 14, which makes it possible to grasp the situation around the vehicle without any lost range. Thus, the vehicle occupant can appropriately grasp the situation around the vehicle 12.

Furthermore, since the control device 22 uses the vehicle speed of the vehicle 12 as a condition at the time of selecting the rear lateral image and performing the image processing process. Therefore, it is possible to display an appropriate image on the inner mirror display 18 in conformity with the state of the vehicle 12 and the situation around the vehicle 12, which are changed depending on the vehicle speed.

That is, if the vehicle speed is equal to or higher than the first threshold value, i.e., if the vehicle 12 is traveling at a relatively high speed, the control device 22 causes the inner mirror display 18 to display the first display image 68 which is generated by selecting the rear lateral images and combining the rear lateral images with the rear image (see FIG. 7). Accordingly, when the vehicle 12 is traveling at a relatively high speed, it is possible for the vehicle occupant to grasp the situation over a wide range on the rear side of the vehicle using the inner mirror display 18.

Figure 8:
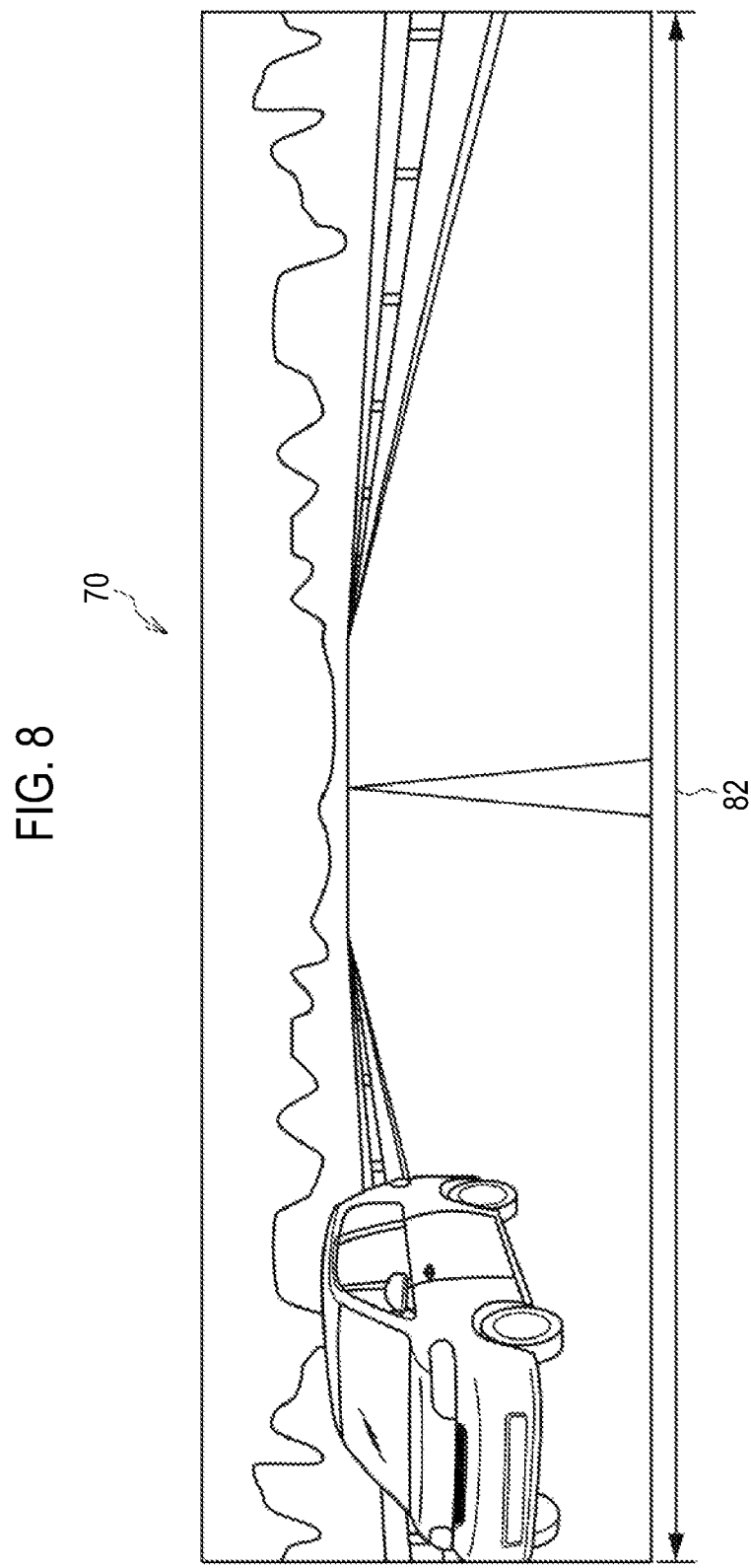
FIG. 8 is a schematic view showing a display state on the display device at the time of low speed traveling corresponding to FIG. 6 in the vehicle including the vehicular electronic mirror system according to the first embodiment.

On the other hand, when the vehicle speed is lower than the second threshold value, i.e., when the vehicle is traveling at a relatively low speed or is stopped, the control device 22 causes the inner mirror display 18 to display the second display image 70 generated only from the rear image (see FIG. 8). Therefore, when the vehicle is traveling at a relatively low speed or is stopped, it is possible for the vehicle occupant to grasp the situation on the rear side of the vehicle without any lost range. This enables the vehicle occupant to more appropriately grasp the situation around the vehicle 12.

In addition, since the control device 22 causes the second display image 70 to be displayed using the second threshold value different from the first threshold value, it is possible to prevent the display of the inner mirror display 18 from being frequently switched when the vehicle speed is maintained at a vehicle speed close to the first threshold value or the second threshold value. This enables the visibility of the vehicle occupant not to be interfered.

Furthermore, since the control device 22 can continuously switch one image to the other when switching the image to be displayed on the inner mirror display 18, it is possible for the vehicle occupant to follow the image change with the eyes. Therefore, as compared with the case where the image is switched suddenly, it is possible to suppress confusion caused by the switching of the image. This makes it possible to reduce the discomfort of the vehicle occupant.

Modification of the First Embodiment

In the embodiment described above, the image displayed on the inner mirror display 18 is switched using the vehicle speed as a condition. However, the disclosure is not limited thereto. The image may be switched using the shift position as a condition. That is, the control device 22 is connected to a shift position detection device (not shown) and is capable of detecting the shift position.

Figure 10:
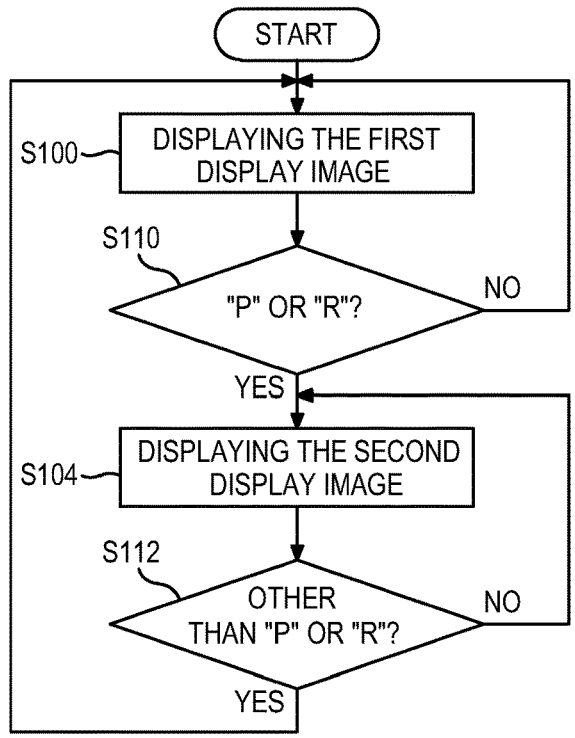
FIG. 10 is a flowchart showing a flow of an operation of a vehicular electronic mirror system according to a modification of the first embodiment.

The control flow of a configuration in which the image is switched depending on the shift position is described below. As shown in FIG. 10, the CPU 48 causes the inner mirror display 18 to display the first display image 68 (step S100). Then, the CPU 48 determines whether the shift position is at "P" or "R" (step S110). If the shift position is not "P" or "R" (if NO in step S110), the CPU 48 repeats the process starting from step S100.

If the shift position is "P" or "R" (if YES in step S110), the CPU 48 causes the inner mirror display 18 to display the second display image 70 (step S104).

Thereafter, the CPU 48 determines whether the shift position is other than "P" or "R" (step S112). If the shift position is not other than "P" or "R", i.e., if the shift position remains "P" or "R" (if NO in step S112), the CPU 48 repeats the process starting from step S104. On the other hand, if the shift position is other than "P" or "R" (if YES in step S112), the CPU 48 repeats the process starting from step S100.

As described above, the shift position of the vehicle 12 is used as a condition for selecting the rear lateral image and performing the image processing process. Therefore, it is possible to cause the display device to display an appropriate image in conformity with the state of the vehicle 12 and the situation around the vehicle 12, which are changed depending on the shift position. That is, when the shift position of the vehicle 12 is selected as "P" for parking the vehicle 12 or "R" for moving the vehicle 12 backward, the display device is caused to display the second display image 70 generated only from the rear image. That is, when the vehicle occupant wants to reliably grasp the rear side of the vehicle, only the rear image is displayed on the inner mirror display 18. This enables the vehicle occupant to grasp the situation on the rear side of the vehicle without any lost range.

Second Embodiment

Next, a vehicular electronic mirror system according to a second embodiment of the disclosure will be described with reference to FIGS. 11 to 16. The same components as those in the first embodiment or the like described above are denoted by the same reference numerals, and the description thereof is omitted.

The basic configuration of the vehicular electronic mirror system 90 according to the second embodiment is the same as that of the first embodiment. The vehicular electronic mirror system 90 according to the second embodiment is characterized in that a third display image 92 (see FIG. 14) obtained by overlapping the rear lateral images with the first display image 68 or the second display image 70 is displayed.

Hardware Configuration

Figure 11:
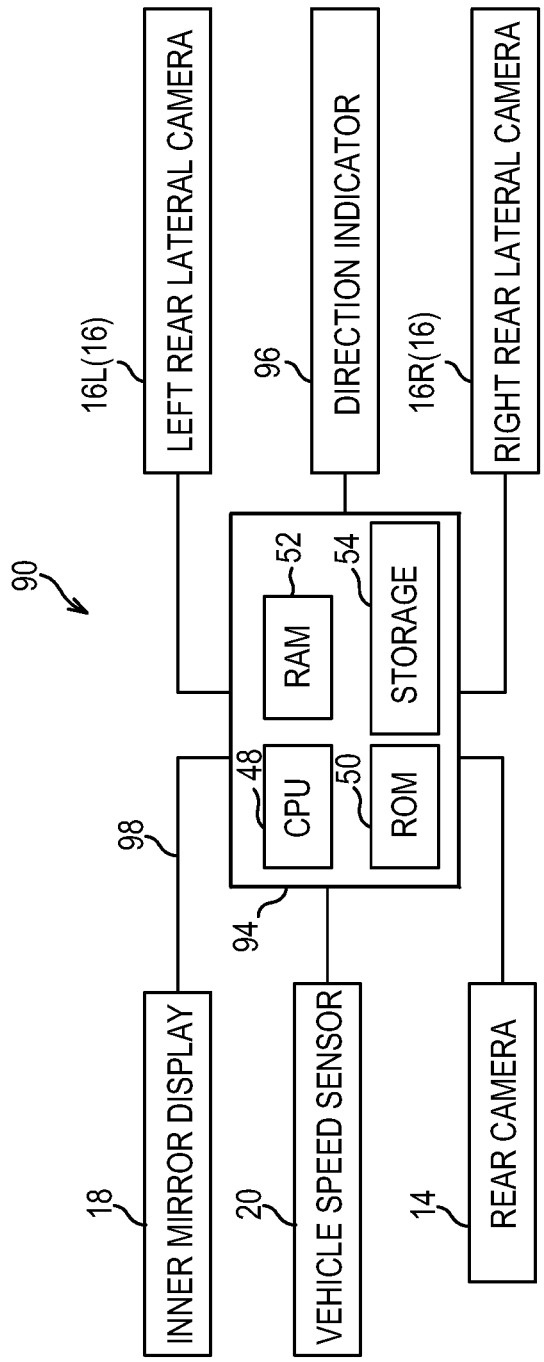
FIG. 11 is a block diagram showing a hardware configuration of a vehicular electronic mirror system according to a second embodiment.

That is, as shown in FIG. 11, the vehicular electronic mirror system 90 includes a rear camera 14, rear lateral camera units 16, an inner mirror display 18, a vehicle speed sensor 20, a control device 94 as an image processing control device and a direction indicator 96. The respective components are communicably connected to one another via a bus 98.

The direction indicator 96 is a so-called winker which indicates, to the outside of the vehicle, one movement direction in the vehicle width direction in the case of a large steering angle or a small steering angle when the vehicle occupant is driving the vehicle 12, by operating a winker lamp (not shown). The direction indicator 96 is provided in the vicinity of a steering wheel 100 (see FIG. 1).

Functional Components

As shown in FIG. 4, the vehicular electronic mirror system 90 includes, as functional components, a traveling state detection unit 102, a determination unit 104, an image processing unit 106 and an output unit 66. Each functional component is realized by the CPU 48 of the control device 94 that reads and executes a surroundings display program stored in the ROM 50 or the storage 54 (see FIG. 3).

The traveling state detection unit 102 receives the rotational speed of the drive mechanism from the vehicle speed sensor 20 and detects the vehicle speed of the vehicle 12 from the rotational speed. Furthermore, it is determined whether the direction indicator 96 is in an operation state. In addition, if the direction indicator 96 is in the operation state, it is determined which direction is the operation direction of the direction indicator 96 (which of the right or left side in the vehicle width direction).

The determination unit 104 receives the vehicle speed, the operation state of the direction indicator 96 and the operation direction of the direction indicator 96 from the traveling state detection unit 102, and determines the traveling state of the vehicle 12 from the magnitude of the vehicle speed used in the first embodiment and the operation state of the direction indicator 96. That is, if the direction indicator 96 is operated toward the left side in the vehicle width direction, it is determined that the vehicle 12 moves to the left side. On the other hand, if the direction indicator 96 is operated toward the right side in the vehicle width direction, it is determined that the vehicle 12 moves to the right side.

Furthermore, depending on the traveling state of the vehicle 12, the determination unit 104 selects the rear lateral images captured by the left rear lateral camera 16L and the right rear lateral camera 16R, and transmits the selected images to the image processing unit 64. Specifically, if it is determined that the vehicle 12 is traveling at a high speed, the rear lateral images captured by the left rear lateral camera 16L and the right rear lateral camera 16R are selected and transmitted to the image processing unit 64. On the other hand, if it is determined that the vehicle 12 is traveling at a low speed or is stopped, the rear lateral images captured by the left rear lateral camera 16L and the right rear lateral camera 16R are not selected. Thus, the rear lateral images are not transmitted to the image processing unit 106.

Furthermore, even when it is determined that the vehicle 12 is moved in the right and left direction, the determination unit 104 selects, as an image to be overlapped, one of the rear lateral images captured by the left rear lateral camera 16L and the right rear lateral camera 16R, and transmits the selected image to the image processing unit 106. That is, if it is determined that the vehicle 12 moves to the left side in the vehicle width direction, the rear lateral image captured by the left rear lateral camera 16L is selected and transmitted to the image processing unit 106. If it is determined that the vehicle 12 moves to the right side in the vehicle width direction, the rear lateral image captured by the right rear lateral camera 16R is selected and transmitted to the image processing unit 106.

The image processing unit 106 performs an image processing process on the rear image captured by the rear camera 14 to adapt the rear image to the inner mirror display 18 as a second display image 70. When the rear lateral images are received from the determination unit 104, a first display image 68 is generated. Furthermore, when the rear lateral images are received as the images to be overlapped from the determination unit 104, the rear lateral images are overlapped on the first display image 68 or the second display image 70 to generate an image. The image thus generated corresponds to a third display image 92 (see FIG. 14) recited in the embodiments.

Figure 12:
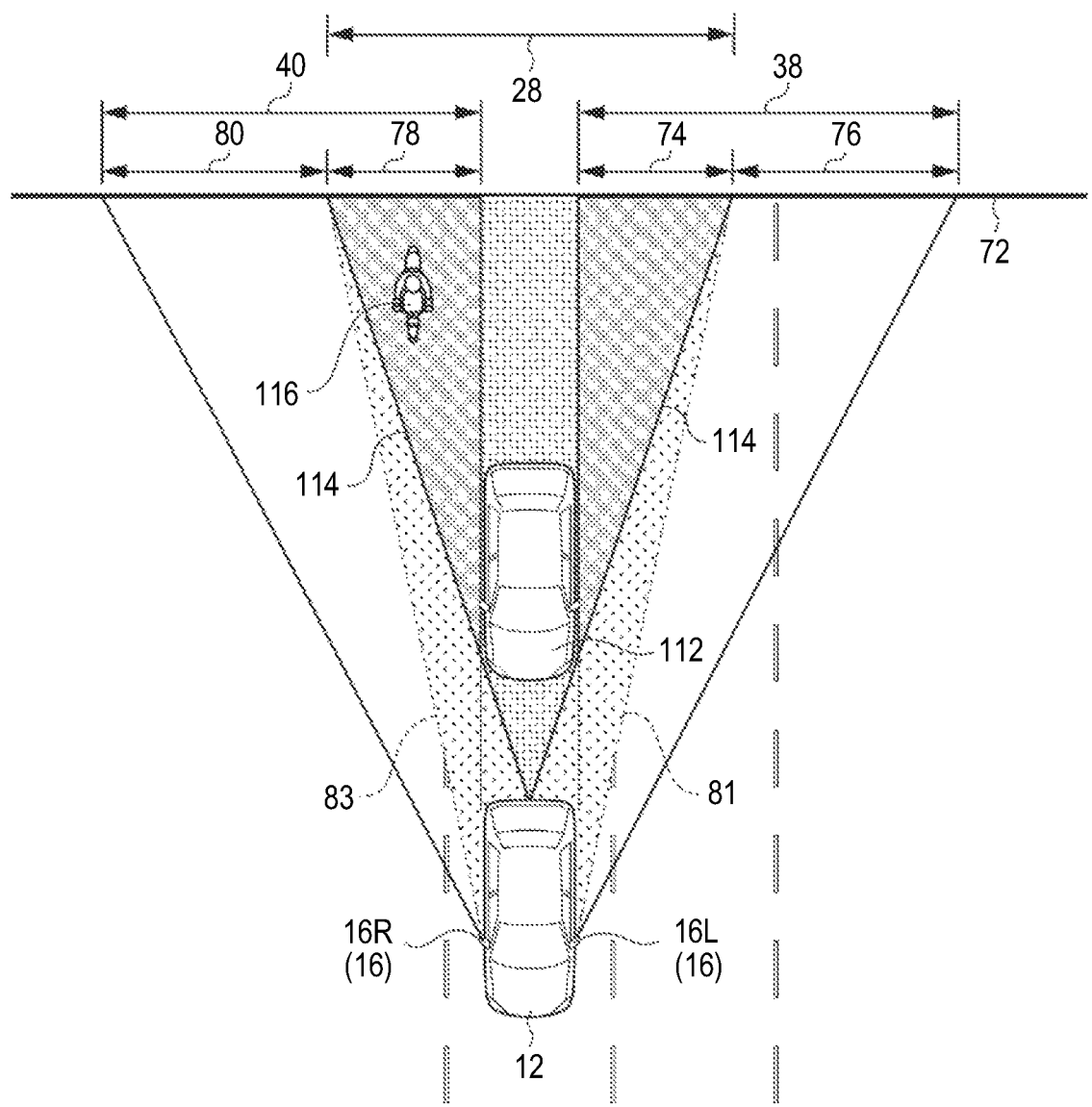
FIG. 12 is a schematic plan view showing an imaging range at the time of high speed traveling in the vehicle including the vehicular electronic mirror system according to the second embodiment.
Figure 13:
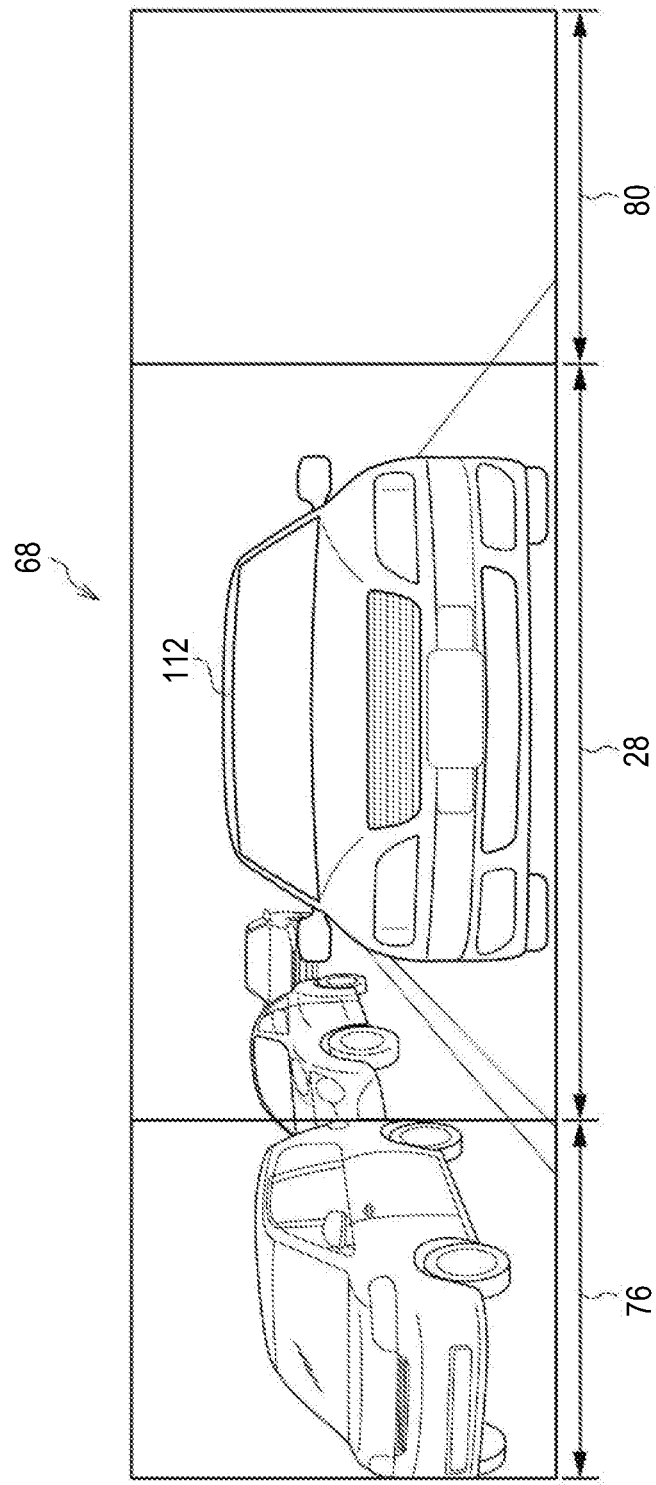
FIG. 13 is a schematic view showing a display state on a display device at the time of high speed traveling corresponding to FIG. 12 in the vehicle including the vehicular electronic mirror system according to the second embodiment.
Figure 14:
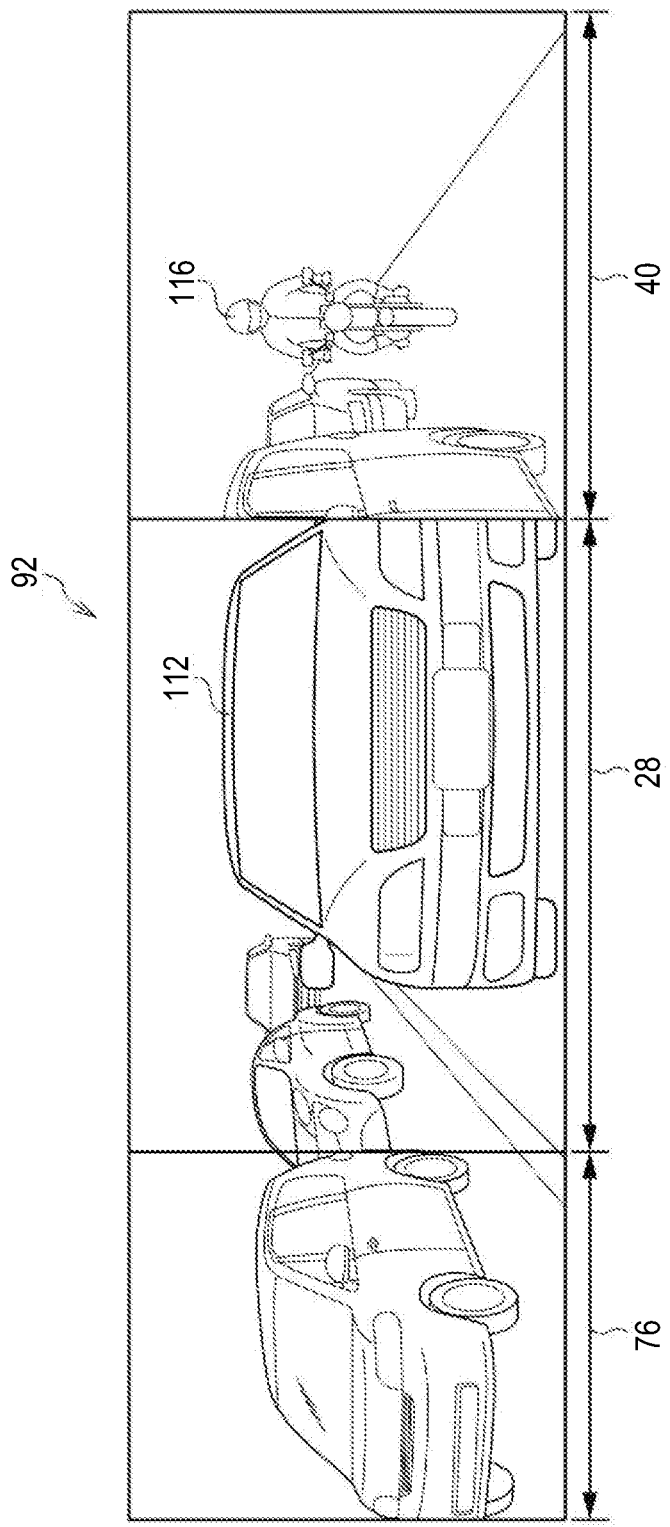
FIG. 14 is a schematic view showing an example of a display state on the display device at the time of high speed traveling corresponding to FIG. 12 and at the time of moving toward one of the right and left sides in the vehicle including the vehicular electronic mirror system according to the second embodiment.

The details of the third display image 92 will now be described. Upon receiving the image extracted from the left rear lateral image as an image to be overlapped, the image processing unit 106 generates a third display image 92 by overlapping and combining the received image on the left side of the first display image 68 or the second display image 70 (see FIG. 14). Similarly, upon receiving the image extracted from the right rear lateral image as an image to be overlapped, the image processing unit 106 generates a third display image 92 by overlapping and combining the received image on the right side of the first display image 68 or the second display image 70. That is, in a state in which the image processing unit 106 displays the first display image 68 shown in FIG. 13, a blind region 114 which does not appear in the first display image 68 (which becomes a blind spot) is generated by a rear vehicle 112 as shown in FIG. 12. In other words, when an object (a two-wheeled vehicle 116 in the example of FIG. 12) exists in the blind region 114, the two-wheeled vehicle 116 is not displayed in the first display image 68 (see FIG. 13). In this state, when the image processing unit 106 receives the left rear lateral image as an image to be overlapped in response to operation of the direction indicator 96, an image falling within the imaging range 38 of the left rear lateral image including the blind region 114 image-captured by the left rear lateral camera 16L is combined and displayed so as to be overlapped on the left side of the rear image as shown in FIG. 14. Thus, it is possible to visually recognize the two-wheeled vehicle 116 existing in the blind region 114.

Process Flow

Figure 15:
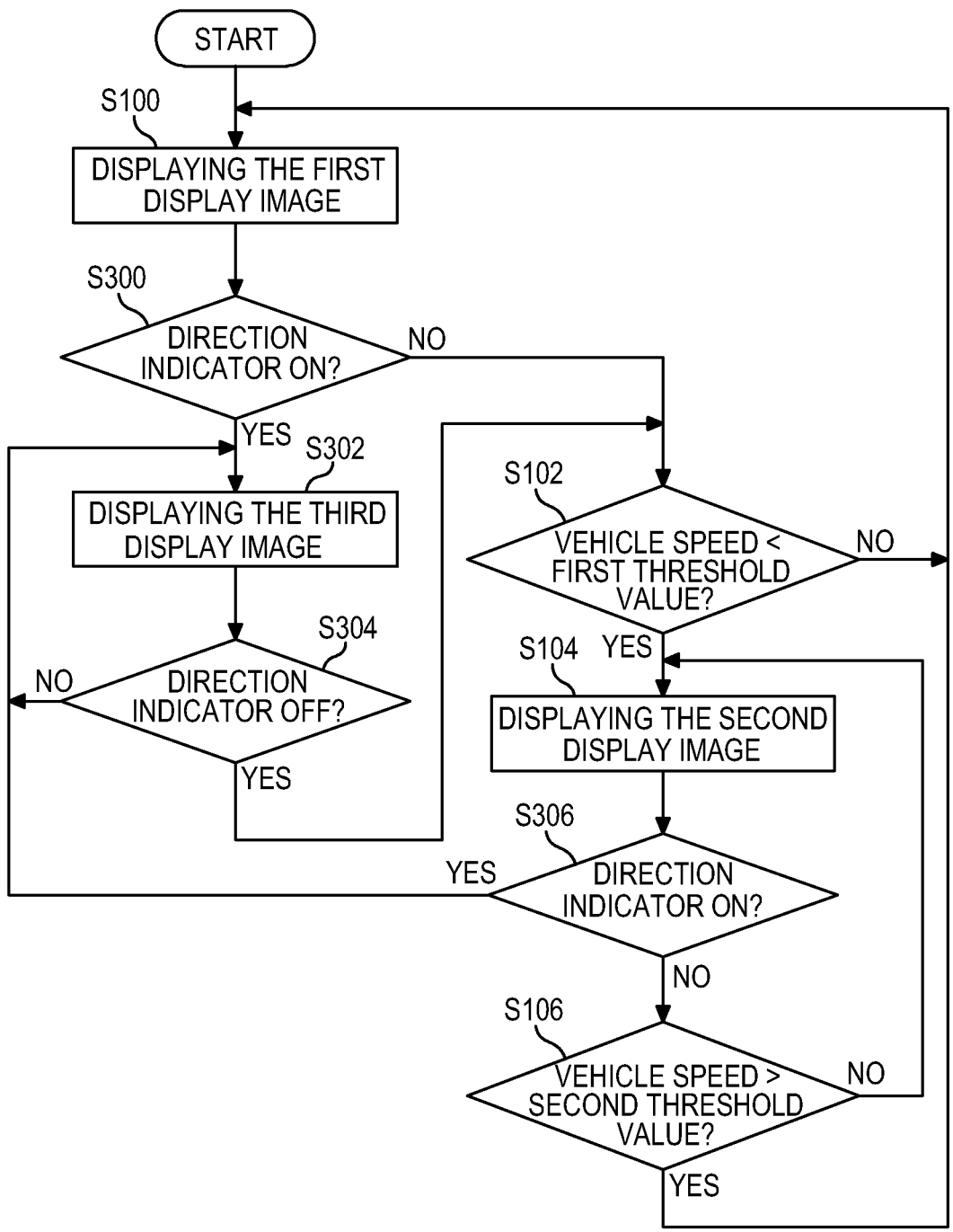
FIG. 15 is a flowchart showing a flow of an operation of the vehicular electronic mirror system according to the second embodiment.

Next, the operation of the vehicular electronic mirror system 90 will be described. FIG. 15 is a flowchart showing the flow of the operation of the vehicular electronic mirror system 90. The CPU 48 reads out the surroundings display program from the ROM 50 or the storage 54, develops the surroundings display program on the RAM 52, and executes the surroundings display program, whereby the image display is performed. The same processes as in the first embodiment are denoted by the same reference numerals, and the description thereof is omitted.

The CPU 48 determines whether the direction indicator 96 is operating (step S300). If the direction indicator 96 is not operating (if NO in step S300), the process starting from step S102 is performed. On the other hand, if the direction indicator 96 is operating (if YES in step S300), the inner mirror display 18 is caused to display a third display image 92 obtained by overlapping the rear lateral image captured on the operation side of the direction indicator 96 with the first display image 68 or the second display image 70 (step S302). Thereafter, the CPU 48 determines whether the operation of the direction indicator 96 is ended (step S304). If the operation of the direction indicator 96 is not ended (if NO in step S304), the CPU 48 repeats the process starting from step S302.

When the operation of the direction indicator 96 is ended (if YES in step S304), the CPU 48 performs the process starting from step S102.

After the process of step S104, the CPU 48 determines whether the direction indicator 96 is operating (step S306). If the direction indicator 96 is operating (if YES in step S306), the CPU 48 repeats the process starting from step S302. On the other hand, if the direction indicator 96 is not operating (if NO in step S306), the CPU 48 performs the process of step S106. Then, when a system termination process of a power unit system of the vehicle 12 is performed, the CPU 48 terminates the process based on the surroundings display program.

Operation and Effect of the Second Embodiment

Next, the operation and effect of the second embodiment will be described.

The vehicular electronic mirror system 90 of the second embodiment has the same configuration as the vehicular electronic mirror system 10 of the first embodiment except that the third display image 92 obtained by overlapping the rear lateral image on the first display image 68 or the second display image 70 is displayed. Therefore, the same effects as those of the first embodiment are obtained. Furthermore, the control device 94 uses the movement in the right and left direction of the vehicle 12 detected from the operation of the direction indicator 96 as a condition for selecting the rear lateral image and performing the image processing process. Therefore, it is possible to display an appropriate image on the display device in conformity with the state of the vehicle 12 and the situation around the vehicle 12, which are changed by the movement in the right and left direction. That is, when the vehicle 12 moves in the right and left direction, the control device 94 causes the inner mirror display 18 to display the third display image 92. The third display image 92 is an image in which the rear lateral image on either the left side or the right side to which the vehicle 12 moves is overlapped on the first display image 68 generated by combining the rear image and the rear lateral images or the second display image 70 generated only from the rear image. Therefore, it is possible for the vehicle occupant to visually recognize the uncombined rear lateral image on the moving direction side while grasping the situation of a wide range on the rear side of the vehicle. Accordingly, the situation of the blind region 114 on one of the right and left moving sides of the vehicle 12 in the blind regions 114 generated on the image by the rear vehicle 112 can be grasped from the third display image 92 shown in FIG. 14.

Modification of the Second Embodiment

In the above-described second embodiment, the first display image 68 or the second display image 70 is switched depending on the vehicle speed of the vehicle 12 and is displayed on the inner mirror display 18. However, the disclosure is not limited thereto. The first display image 68 or the third display image 92 may be displayed on the inner mirror display 18 depending on only the operation state of the direction indicator 96.

Figure 16:
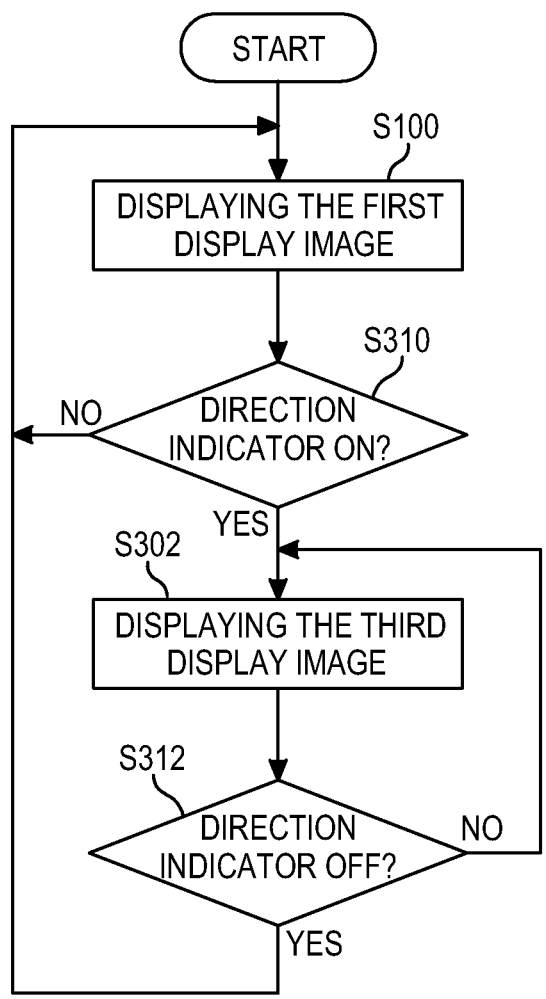
FIG. 16 is a flowchart showing a flow of an operation of a vehicular electronic mirror system according to a modification of the second embodiment.

That is, as shown in FIG. 16, while displaying the first display image 68 on the inner mirror display 18, the CPU 48 determines whether the direction indicator 96 is in operating (step S310). If the direction indicator 96 is not operating (if NO in step S310), the process starting from step S100 is performed. On the other hand, if the direction indicator 96 is operating (if YES in step S310), the inner mirror display 18 is caused to display a third display image 92 obtained by overlapping the rear lateral image captured on the operation side of the direction indicator 96 (step S302).

Thereafter, the CPU 48 determines whether the operation of the direction indicator 96 is ended (step S312). If the operation of the direction indicator 96 is not ended (if NO in step S312), the CPU 48 repeats the process starting from step S302. On the other hand, if the operation of the direction indicator 96 is ended (if YES in step S312), the CPU 48 performs the process starting from step S100.

Even with the above-described configuration, it is possible for the vehicle occupant to visually recognize the uncombined rear lateral image on the moving direction side while grasping the situation of a wide range on the rear side of the vehicle. Accordingly, the situation of the blind region 114 on one of the right and left moving sides of the vehicle 12 in the blind regions 114 (see FIG. 12) generated on the first display image 68 by the rear vehicle 112 can be grasped from the third display image 92 (see FIG. 14).

Furthermore, in the second embodiment described above, the movement of the vehicle 12 in the right and left direction is determined by the operation state of the direction indicator 96. However, the disclosure is not limited thereto. The movement of the vehicle 12 in the right and left direction may be determined based on the information on the steering angle of a steering wheel 100.

Third Embodiment

Next, a vehicular electronic mirror system according to a third embodiment of the disclosure will be described with reference to FIGS. 17 to 22. The same components as those in the first embodiment or the like described above are denoted by the same reference numerals, and the description thereof is omitted.

The basic configuration of the vehicular electronic mirror system 120 according to the third embodiment is the same as that of the first embodiment. The vehicular electronic mirror system 120 according to the third embodiment is characterized in that a fourth display image 136 obtained by overlapping the rear lateral images with the first display image 68 or the second display image 70 based on the detection result of a surroundings detection sensor 124 is displayed.

Hardware Configuration

Figure 17:
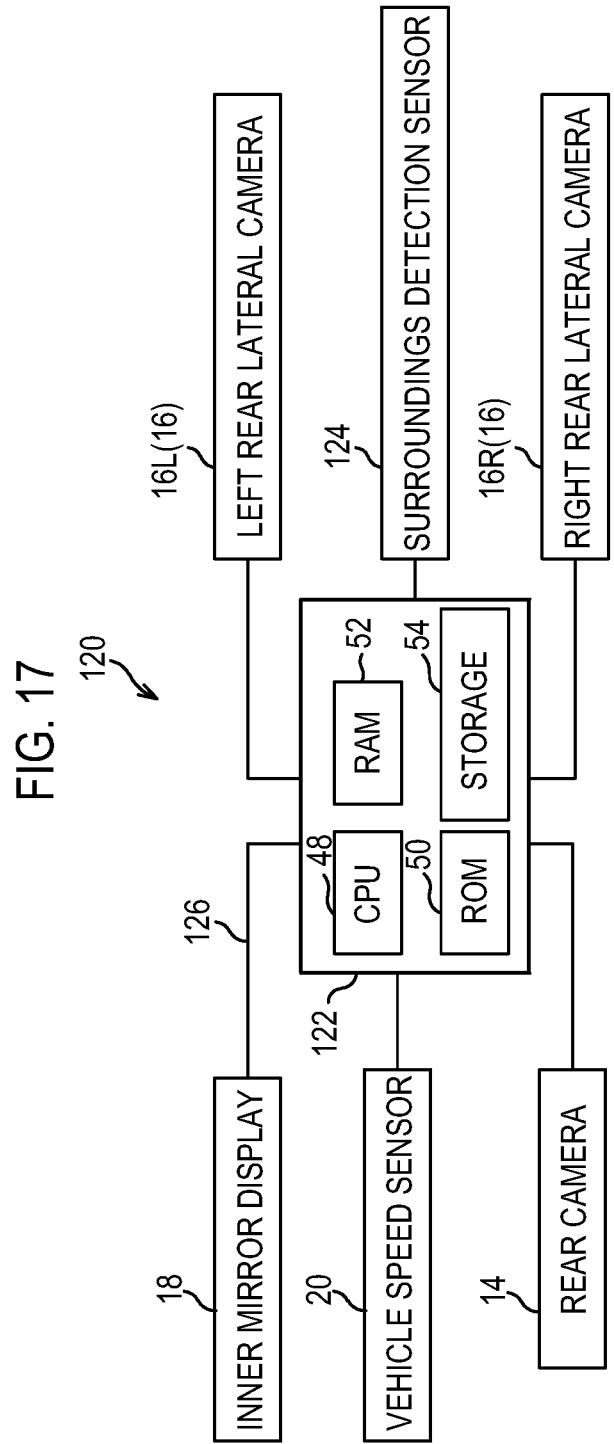
FIG. 17 is a block diagram showing a hardware configuration of a vehicular electronic mirror system according to a third embodiment.

That is, as shown in FIG. 17, the vehicular electronic mirror system 120 includes a rear camera 14, rear lateral camera units 16, an inner mirror display 18, a vehicle speed sensor 20, a control device 122 as an image processing control device and a surroundings detection sensor 124. The respective components are communicably connected to one another via a bus 126.

The surroundings detection sensor 124 is a sensor that detects the situation around a vehicle 12. The surroundings detection sensor 124 includes, for example, a laser radar, an ultrasonic sensor and a millimeter wave radar (all of which are not shown). The surroundings detection sensor 124 may be configured by combining a plurality of sensors. In addition to these, the surroundings detection sensor 124 may be configured to detect the situation around the vehicle 12 by image recognition using a camera.

Functional Component

Figure 18:
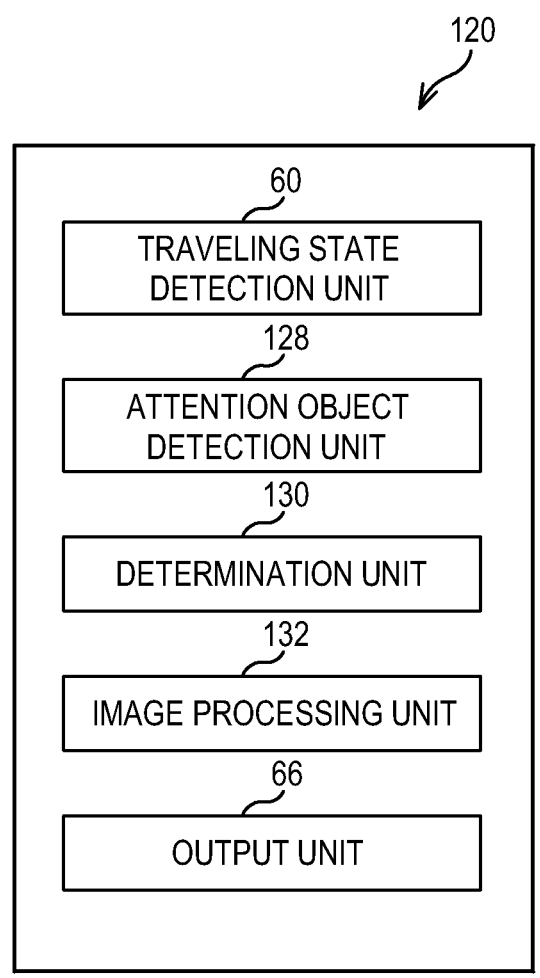
FIG. 18 is a block diagram showing the functional components of the vehicular electronic mirror system according to the third embodiment.

As shown in FIG. 18, the vehicular electronic mirror system 120 includes, as functional components, a traveling state detection unit 60, an attention object detection unit 128, a determination unit 130, an image processing unit 132 and an output unit 66. Each functional component is realized by the CPU 48 of the control device 122 that reads and executes a surroundings display program stored in the ROM 50 or the storage 54 (see FIG. 3).

Figure 19:
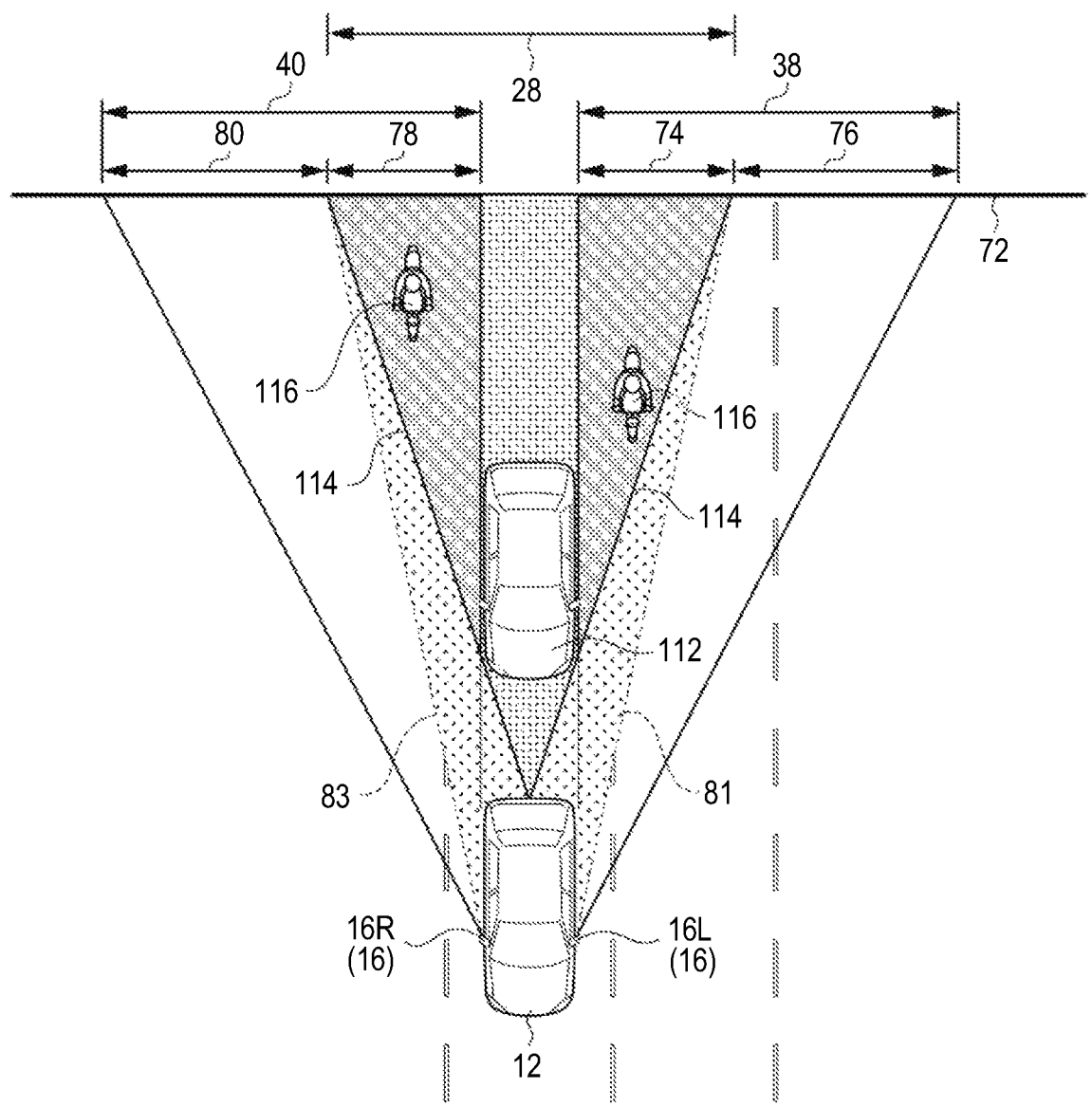
FIG. 19 is a schematic plan view showing an imaging range at the time of high speed traveling in the vehicle including the vehicular electronic mirror system according to the third embodiment.
Figure 20:
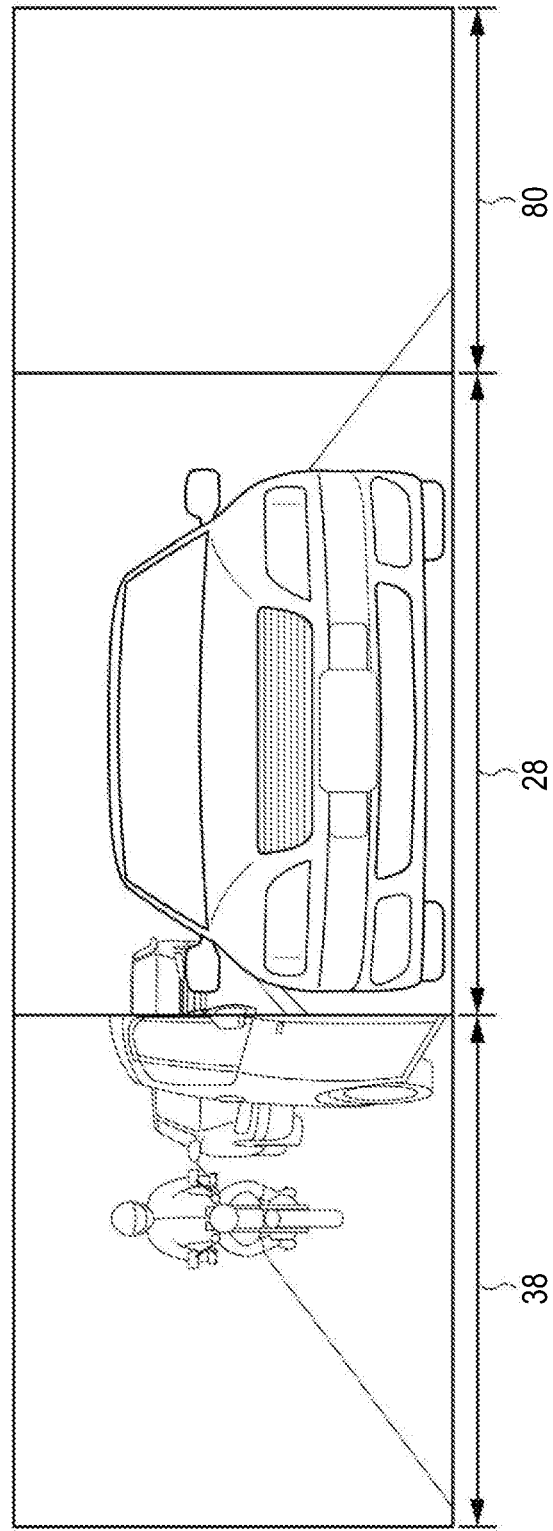
FIG. 20 is a schematic view showing an example of a display state on the display device at the time of high speed traveling corresponding to FIG. 19 and at the time of object detection in the vehicle including the vehicular electronic mirror system according to the third embodiment.
Figure 21:
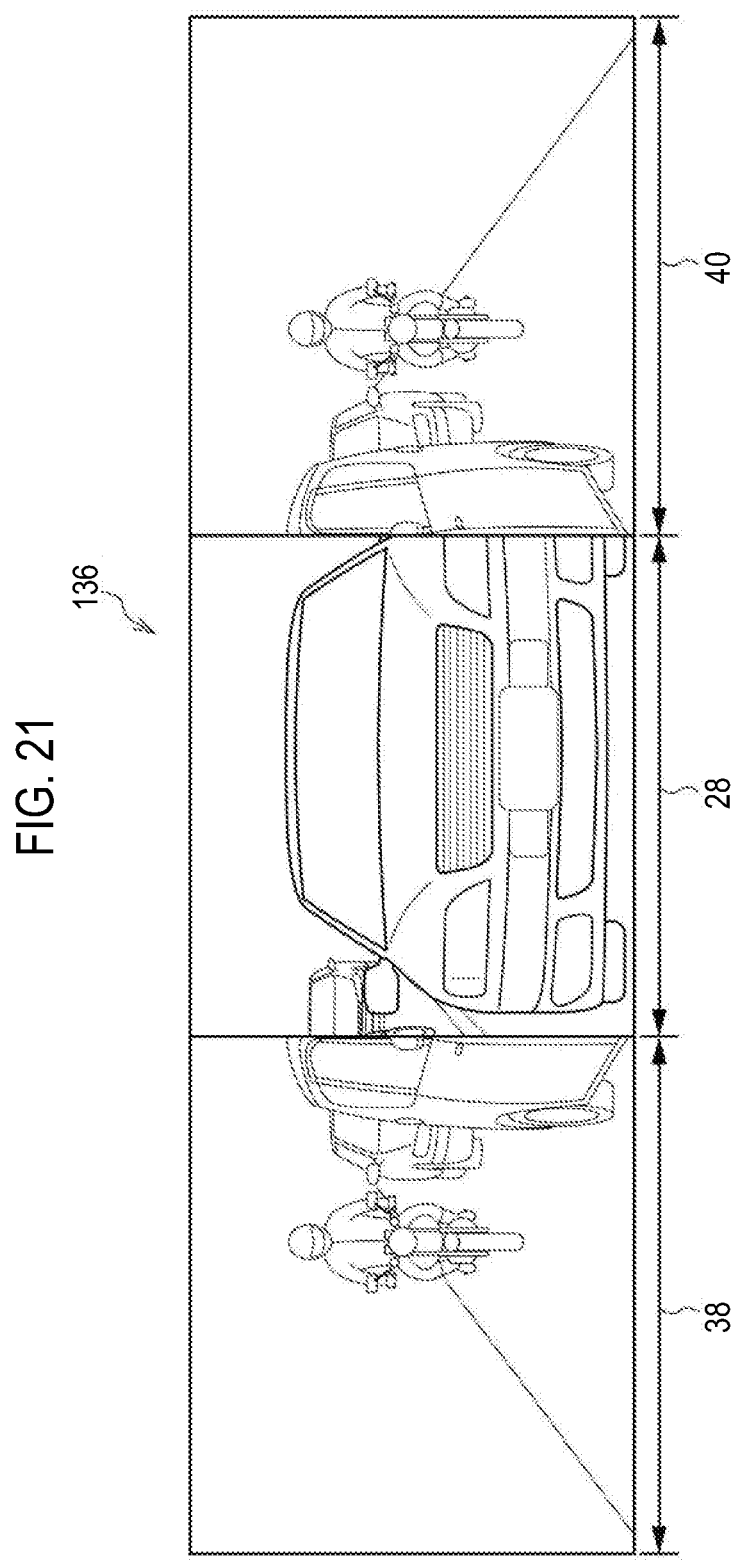
FIG. 21 is a schematic view showing an example in which the display state of the display device differs from that of FIG. 20.

The attention object detection unit 128 receives information on the situation around the vehicle from the surroundings detection sensor 124 and specifies the presence/absence, type, position and the like of an attention object (two-wheeled vehicles 116 in the example of FIG. 19).

The determination unit 130 receives a vehicle speed from the traveling state detection unit 60 and determines the traveling state of the vehicle 12 from the magnitude of the vehicle speed as in the first embodiment to select the rear lateral images. Specifically, when it is determined that the vehicle 12 is traveling at a high speed, the rear lateral images captured by the left rear lateral camera 16L and the right rear lateral camera 16R are selected and transmitted to the image processing unit 132. On the other hand, when it is determined that the vehicle 12 is traveling at a low speed, the rear lateral images captured by the left rear lateral camera 16L and the right rear lateral camera 16R are not selected. Thus, the rear lateral images are not transmitted to the image processing unit 132.

Furthermore, the determination unit 130 receives the information on the attention object from the attention object detection unit 128. Depending on the presence or absence and the position of the attention object, the determination unit 130 selects the rear lateral images captured by the left rear lateral camera 16L and the right rear lateral camera 16R and transmits the selected images to the image processing unit 132. Specifically, when it is determined that the attention object is present near the left rear side of the vehicle 12, the rear lateral image captured by the left rear lateral camera 16L is selected as an image to be overlapped and is transmitted to the image processing unit 132. On the other hand, when it is determined that the attention object is present near the right rear side of the vehicle 12, the rear lateral image captured by the right rear lateral camera 16R is selected as an image to be overlapped and is transmitted to the image processing unit 132.

The image processing unit 132 performs an image processing process on the rear image captured by the rear camera 14 to adapt the rear image to the inner mirror display 18 as a second display image 70. Furthermore, when the rear lateral images are received from the determination unit 130, the image processing unit 132 generates a first display image 68 which combines the rear image and the rear lateral images. Moreover, when the rear lateral images are received as the images to be overlapped from the determination unit 130, the received rear lateral images are overlapped on the first display image 68 or the second display image 70 to generate an image. The images thus generated corresponds to a fourth display image 136 (see FIGS. 20 and 21) recited in the embodiments.

The details of the fourth display image 136 will now be described. Upon receiving the image extracted from the right rear lateral image as an image to be overlapped, the image processing unit 132 generates a fourth display image 136 obtained by combining the right rear lateral image on the right side of the first display image 68 or the second display image 70 (see FIG. 20). On the other hand, upon receiving the image extracted from the left rear lateral image as an image to be overlapped, the image processing unit 132 generates a fourth display image 136 obtained by combining the left rear lateral image on the left side of the first display image 68 or the second display image 70. In addition, upon simultaneously receiving the image extracted from the left rear lateral image and the image extracted from the right rear lateral image as images to be overlapped, the image processing unit 132 generates a fourth display image 136 obtained by combining the left rear lateral image on the left side of the first display image 68 or the second display image 70 and combining the right rear lateral image on the right side of the first display image 68 or the second display image 70 (see FIG. 21). In other words, the rear lateral images are overlapped on the right and left sides of the first display image 68 or the second display image 70. Thus, it is possible to visually recognize the two two-wheeled vehicles 116 existing in the blind region 114 shown in FIG. 19.

Process Flow

Figure 22:
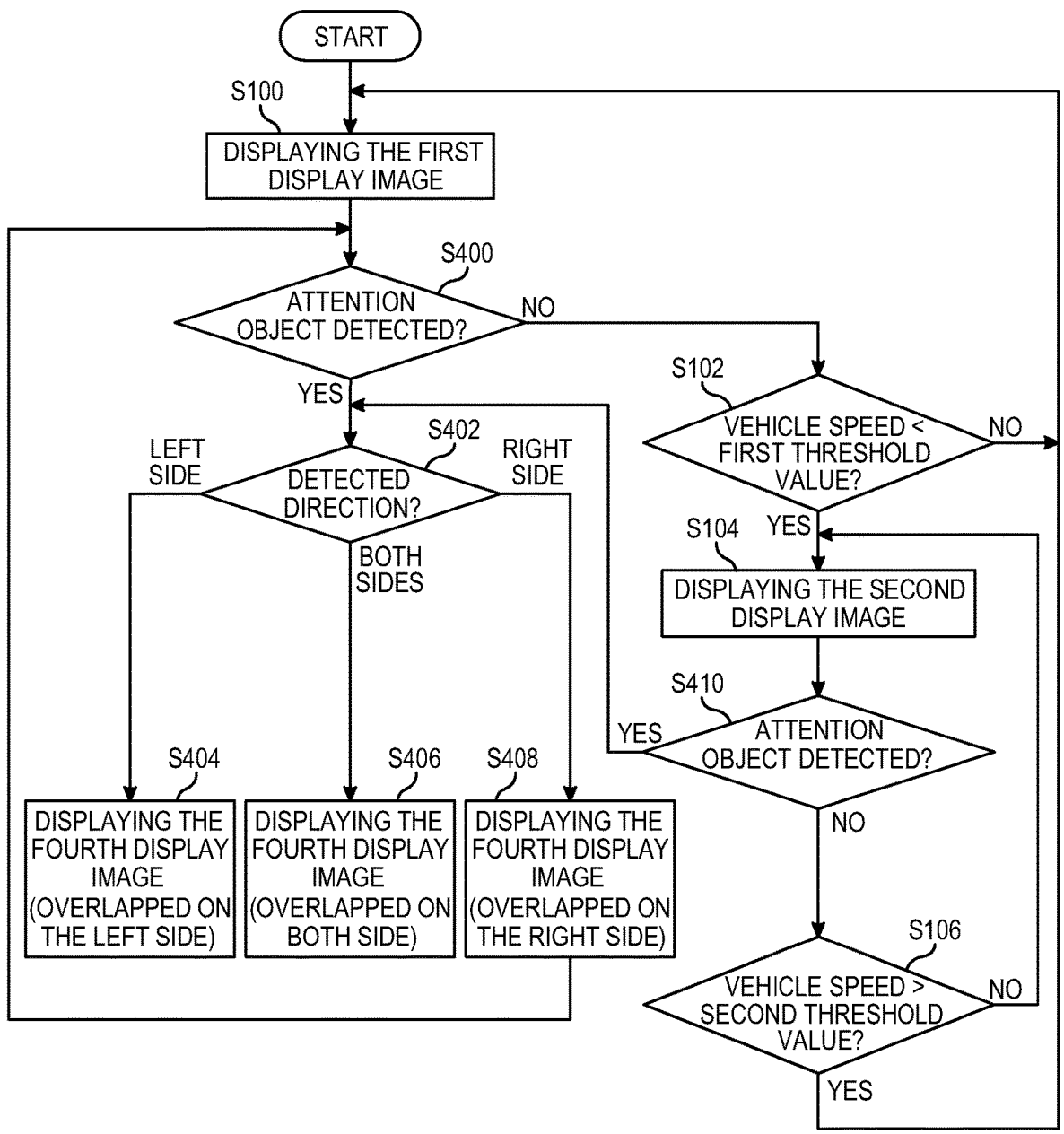
FIG. 22 is a flowchart showing a flow of an operation of the vehicular electronic mirror system according to the third embodiment.

Next, the operation of the vehicular electronic mirror system 120 will be described. FIG. 22 is a flowchart showing the flow of the operation of the vehicular electronic mirror system 120. The CPU 48 reads out the surroundings display program from the ROM 50 or the storage 54, develops the surroundings display program on the RAM 52, and executes the surroundings display program, whereby the image display is performed. The same processes as in the first embodiment are denoted by the same reference numerals, and the description thereof is omitted.

The CPU 48 determines whether an attention object is detected (step S400). If the attention object is not detected (if NO in step S400), the process starting from step S102 is performed. On the other hand, if the attention object is detected (if YES in step S400), the CPU 48 determines the detected direction of the attention object (step S402).

If it is determined that the detected direction of the attention object is the left rear side (if the left side in step S402), the CPU 48 causes the inner mirror display 18 to display a fourth display image 136 in which the rear lateral image captured by the left rear lateral camera 16L is overlapped on the first display image 68 or the second display image 70 (step S404).

If it is determined that the detected direction of the attention object is the right rear side (if the right side in step S402), the CPU 48 causes the inner mirror display 18 to display a fourth display image 136 in which the rear lateral image captured by the right rear lateral camera 16R is overlapped on the first display image 68 or the second display image 70 (step S408).

If it is determined that the detected direction of the attention object is both the left rear side and the right rear side (if both sides in step S402), the CPU 48 causes the inner mirror display 18 to display an image in which the rear lateral images captured by the left rear lateral camera 16L and the right rear lateral camera 16R are overlapped on the first display image 68 or the second display image 70 (step S406).

After the process of step S104, the CPU 48 determines whether an attention object is detected (step S410). If the attention object is detected (if YES in step S410), the CPU 48 repeats the process starting from step S402. On the other hand, if the attention object is not detected (if NO in step S410), the CPU 48 performs the process of step S106. Then, when a system termination process of a power unit system of the vehicle 12 is performed, the CPU 48 terminates the process based on the surroundings display program.

Operation and Effect of the Third Embodiment

Next, the operation and effect of the third embodiment will be described.

The vehicular electronic mirror system 120 of the third embodiment has the same configuration as the vehicular electronic mirror system 10 of the first embodiment except that the fourth display image 136 obtained by overlapping the rear lateral image on the first display image 68 or the second display image 70 is displayed. Therefore, the same effects as those of the first embodiment are obtained. Furthermore, the control device 122 uses the case where an object is detected around the vehicle 12, as a condition for selecting the rear lateral images and performing the image processing process. Therefore, an appropriate image that enables the vehicle occupant to easily grasp the object existing around the vehicle can be displayed on the inner mirror display 18. That is, when an object is detected around the vehicle 12, the control device 122 causes the inner mirror display 18 to display the fourth display image 136 (see FIGS. 20 and 21). The fourth display image 136 is an image in which the rear lateral image on either the left side or the right side corresponding to the object detection direction is overlapped on the first display image 68 generated by combining the rear image and the rear lateral images or the second display image 70 generated only from the rear image. Therefore, it is possible for the vehicle occupant to visually recognize the uncombined rear lateral image on the object detection side while grasping the situation of a wide range on the rear side of the vehicle. This makes it possible to easily grasp the object. Thus, the vehicle occupant can more appropriately grasp the situation around the vehicle.

In the first to third embodiments described above, the vehicle speed is determined based on the first threshold value and the second threshold value. However, the disclosure is not limited thereto. It may be possible to adopt a configuration in which the vehicle speed is determined using one threshold value.

In the third embodiment described above, the first display image 68, the second display image 70 and the fourth display image 136 are switched according to the detection result obtained by the surroundings detection sensor 124 and the vehicle speed, and are displayed on the inner mirror display 18. However, the disclosure is not limited thereto. The first display image 68, the second display image 70 and the fourth display image 136 may be switched according to only the detection result obtained by the surroundings detection sensor 124 and may be displayed on the inner mirror display 18.

Furthermore, although the surroundings detection sensor 124 is configured to detect an object existing around the vehicle 12, the object to be detected may be limited to a specific object. That is, the surroundings detection sensor 124 may detect only the two-wheeled vehicle 116 and the person, which are highly likely to entirely enter the blind regions 81 and 83 not appearing in the image. Therefore, while suppressing the frequent switching of the displayed images, the vehicle occupant can grasp, from the fourth display image 136, the two-wheeled vehicle 116 and the person that are highly likely to completely disappear from the image.

Furthermore, the first display image 68, the second display image 70 and the fourth display image 136 are switched according to the detection result obtained by the surroundings detection sensor 124 and the vehicle speed, and are displayed on the inner mirror display 18. However, the disclosure is limited thereto. The first display image 68, the second display image 70 and the fourth display image 136 may be switched according to the movement of the vehicle 12 in the right and left direction based on the operation of the direction indicator 96 or the steering angle of the steering wheel 100.

Furthermore, the inner mirror display 18 is provided as the display device. However, the disclosure is not limited thereto. A display (not shown) provided on an instrument panel may be used as the display device. A head-up display device projected and displayed on a front windshield glass may be used as the display device. Other devices may be used as the display device.

While the embodiments of the disclosure have been described above, the disclosure is not limited to the above embodiments. It goes without saying that various modifications other than the above embodiments may be made without departing from the spirit of the disclosure.

What is claimed is:

1. A vehicular electronic mirror system, comprising:
   a rear imaging device configured to capture an image of a rear side of a vehicle;
   rear lateral imaging devices respectively configured to capture images of right and left rear sides of the vehicle; and
   an electronic control device configured to
   perform, according to at least one of a state of the vehicle and a situation around the vehicle, different image processing processes on a rear image captured by the rear imaging device and rear lateral images captured by the rear lateral imaging devices, the rear lateral images being selected according to at least one of the state of the vehicle and the situation around the vehicle, and
   cause a display device to display the rear image and the rear lateral images,
   wherein the electronic control device is configured to include a vehicle speed of the vehicle into a condition for selecting the rear lateral images and a condition for performing the image processing processes, and
   wherein the electronic control device is further configured to
      select, when the vehicle speed is equal to or higher than a predetermined threshold value, the rear lateral images,
      cause the display device to display a first display image generated by combining the rear image and the rear lateral images, and
      cause the display device to display, when the vehicle speed is lower than the predetermined threshold value, a second display image generated only from the rear image.

2. The vehicular electronic mirror system according to claim 1, wherein
   the electronic control device is configured to include a shift position of the vehicle into a condition for selecting the rear lateral images and a condition for performing the image processing processes.

3. The vehicular electronic mirror system according to claim 2, wherein
   the electronic control device is configured to cause the display device, when the shift position of the vehicle is selected to a position corresponding to a state in which the vehicle is parked or a position corresponding to a state in which the vehicle is moved backward, to display the second display image generated only from the rear image.

4. The vehicular electronic mirror system according to claim 1, wherein
   the electronic control device is configured to include movement of the vehicle in a right and left direction into a condition for selecting the rear lateral images and a condition for performing the image processing processes.

5. The vehicular electronic mirror system according to claim 4, wherein
   the electronic control device is configured to select the rear lateral images, and cause the display device to display a third display image, in which a rear lateral image on either a left side or a right side to which the vehicle moves is overlapped on the first display image generated by combining the rear image and the rear lateral images or the second display image generated only from the rear image, when the vehicle is moved in the right and left direction.

6. The vehicular electronic mirror system according to claim 1, wherein
   the electronic control device is configured to include a case where an object existing around the vehicle is detected, into a condition for selecting the rear lateral images according to the state of the vehicle and the situation around the vehicle and a condition for performing the image processing processes according to the state of the vehicle and the situation around the vehicle.

7. The vehicular electronic mirror system according to claim 6, wherein the electronic control device is configured to select, the rear lateral images, and cause the display device to display a third display image, in which a rear lateral image on either a left side or a right side corresponding to a direction in which an object is detected is overlapped on the first display image generated by combining the rear image and the rear lateral images or the second display image generated only from the rear image, when the object is detected around the vehicle.

8. The vehicular electronic mirror system according to claim 1, wherein
   the electronic control device is configured to continuously switch one image to another image when switching an image to be displayed on the display device.

* * * * *